United States Patent [19]

Kajiwara

[11] Patent Number: 5,872,872
[45] Date of Patent: Feb. 16, 1999

[54] IMAGE PROCESSING SYSTEM AND ITS METHOD AND ELECTRONIC SYSTEM HAVING AN IMAGE PROCESSING SYSTEM

[75] Inventor: Seiichi Kajiwara, Tokyo, Japan

[73] Assignee: Sega Enterprises, Tokyo, Japan

[21] Appl. No.: 939,319

[22] Filed: Sep. 29, 1997

Related U.S. Application Data

[62] Division of Ser. No. 392,732, Feb. 24, 1995.

[30] Foreign Application Priority Data

Jun. 30, 1993 [JP] Japan .................................. 5-162978
Jun. 30, 1993 [JP] Japan .................................. 5-162979

[51] Int. Cl.[6] .............................. G06L 9/32; G06L 9/36; G09G 5/00; G09G 5/34
[52] U.S. Cl. ......................... 382/296; 382/276; 345/113; 345/126
[58] Field of Search .................................. 382/293, 296, 382/298, 276; 348/575, 586, 588; 345/114, 113, 119, 123, 126, 120, 121, 127, 139, 190, 581; 711/200, 202, 203, 211, 214, 217

[56] References Cited

U.S. PATENT DOCUMENTS 4,642,790 2/1987 Minshull et al. ....................... 345/121
4,824,106 4/1989 Ueda et al. ............................. 345/113
5,327,158 7/1994 Takahashi et al. ....................... 345/123
5,384,912 1/1995 Oginc et al. ............................. 345/523
5,434,591 7/1995 Goto et al. ............................... 345/123

FOREIGN PATENT DOCUMENTS

| 62-3382 | 1/1987 | Japan | G06F 15/66 |
| 63-66678 | 3/1988 | Japan | G06F 15/66 |
| 63-101975 | 5/1988 | Japan | G06F 15/66 |
| 63-124178 | 5/1988 | Japan | G06F 15/66 |
| 6464069 | 3/1989 | Japan | G06F 15/62 |
| 1106179 | 4/1989 | Japan | G06F 15/62 |
| 1120596 | 5/1989 | Japan | G09G 1/100 |
| 2110785 | 4/1990 | Japan | G06F 15/66 |
| 2199580 | 8/1990 | Japan | G06F 15/62 |
| 363695 | 3/1991 | Japan | G09G 5/36 |
| 4235592 | 8/1992 | Japan | G09G 5/14 |
| 178690 | 2/1992 | Taiwan | G06F 15/62 |
| 209287 | 7/1993 | Taiwan | G06F 15/62 |

Primary Examiner—David K. Moore
Assistant Examiner—Wenpeng Chen
Attorney, Agent, or Firm—Price Gess & Ubell

[57] ABSTRACT

An image processing system which allows a variety of different types of split-screen image data, including window displays, to be generated. The image processing system of the present invention further can display windows of various shapes to ensure diversified use of display screens. The image processing system also enables various types of movement and rotation transformation as well as scaling transformation to be performed while reducing the calculation load on the CPU.

9 Claims, 16 Drawing Sheets

FIG. 8

NO ROTATION

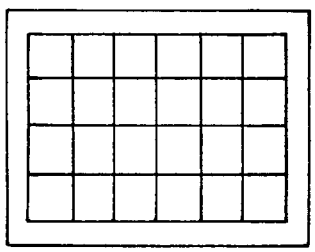

$$\begin{pmatrix} 1 & 0 & 0 \\ 0 & 1 & 1 \\ 0 & 0 & 1 \end{pmatrix}$$

FIG. 9

X-AXIS ROTATION

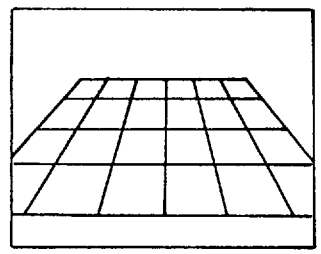

$$\begin{pmatrix} 1 & 0 & 0 \\ 0 & \cos\theta & -\sin\theta \\ 0 & \sin\theta & \cos\theta \end{pmatrix}$$

FIG. 10

Y-AXIS ROTATION

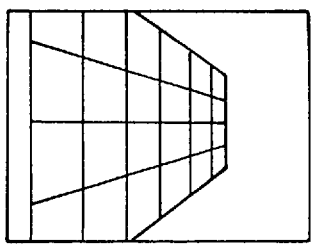

$$\begin{pmatrix} \cos\theta & 0 & \sin\theta \\ 0 & 1 & 0 \\ -\sin\theta & 0 & \cos\theta \end{pmatrix}$$

FIG. 11

Z-AXIS ROTATION

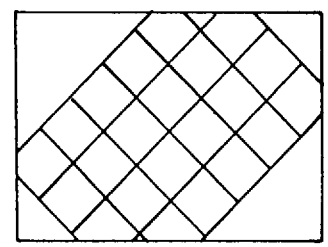

$$\begin{pmatrix} \cos\theta & -\sin\theta & 0 \\ \sin\theta & \cos\theta & 0 \\ 0 & 0 & 1 \end{pmatrix}$$

FIG. 21A
X-AXIS ROTATION
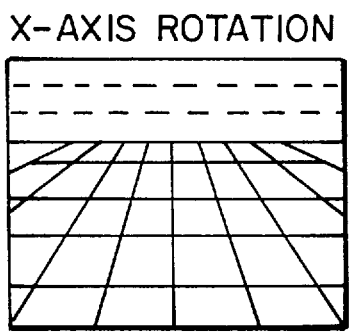
FIG. 21B
X-AXIS ROTATION +
SCREEN-AXIS ROTATION
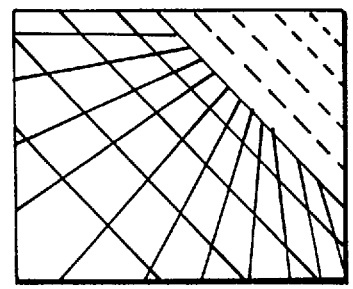

ORIGINAL SCREEN

X-AXIS ROTATION

X-AXIS ROTATION +
SCREEN-AXIS ROTATION

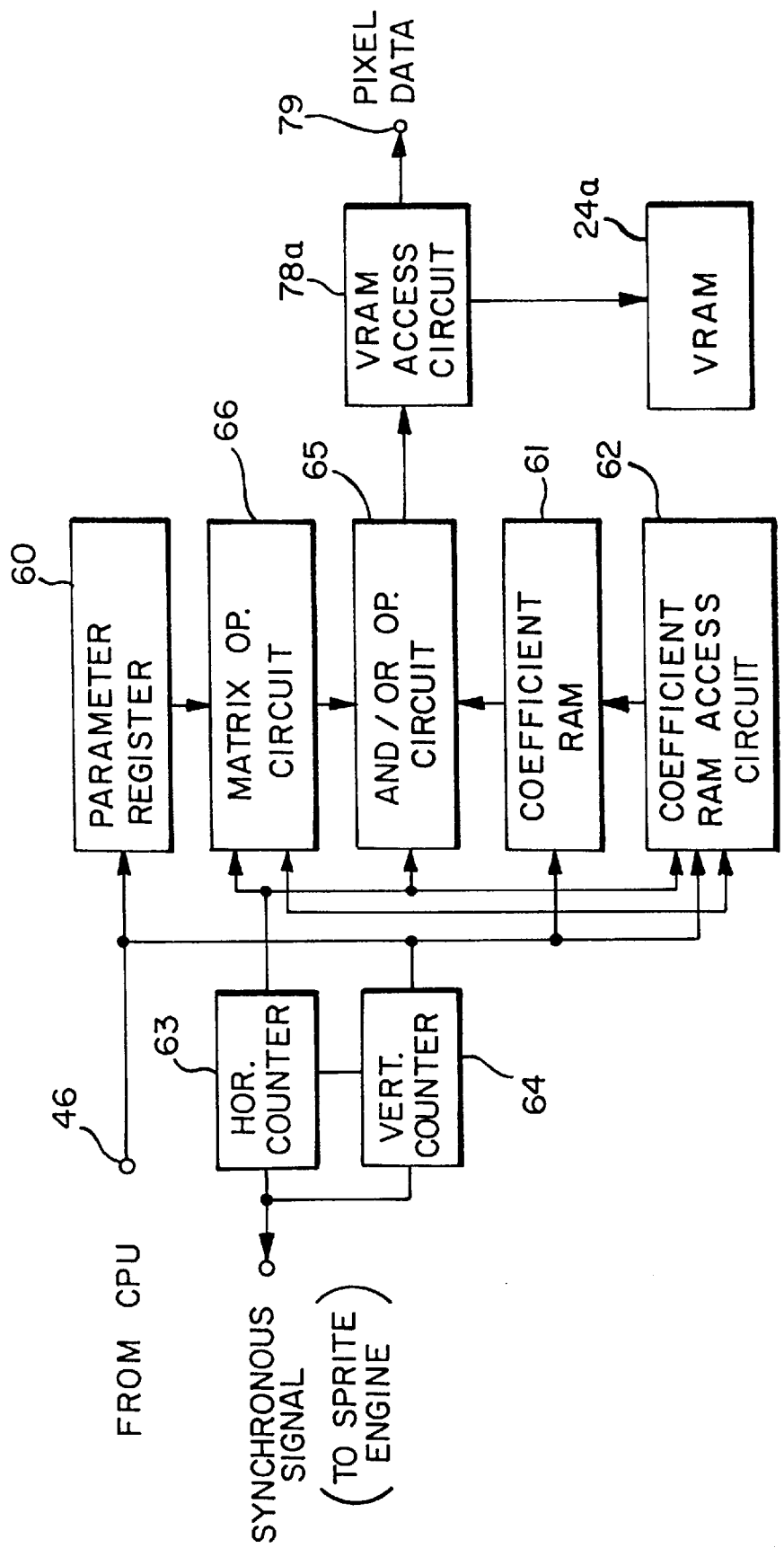

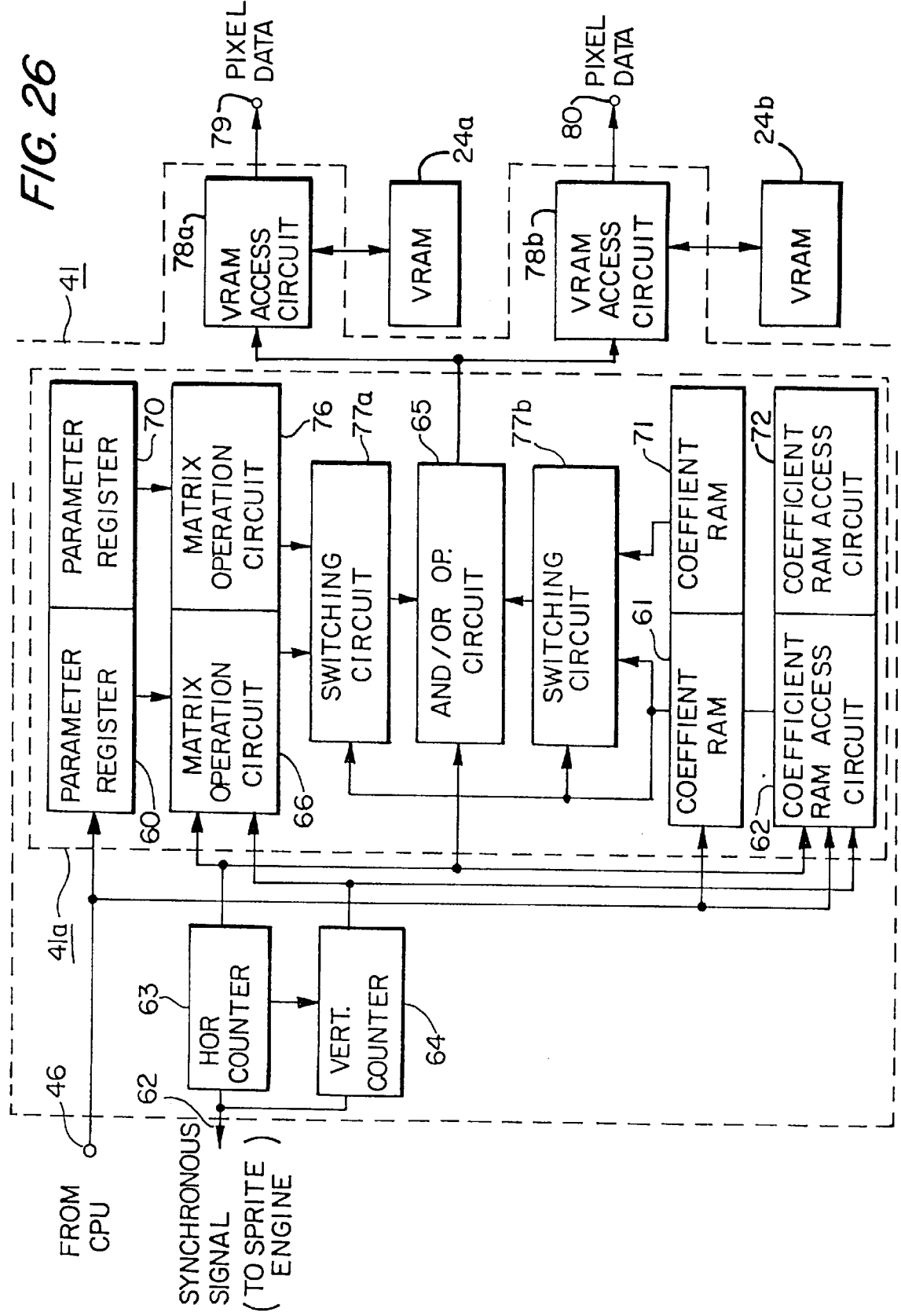

IMAGE PROCESSING SYSTEM AND ITS METHOD AND ELECTRONIC SYSTEM HAVING AN IMAGE PROCESSING SYSTEM

This is a divisional of U.S. Ser. No. 08/392,732, filed on Feb. 24, 1995.

TECHNICAL FIELD

This invention relates to an image processing system and its method and to an electronic system having an image processing system. It relates particularly to the image processing technique used to perform the movement transformation and/or rotation transformation in a video entertainment system.

BACKGROUND ART

As more and more people have an interest in multimedia today, methods and systems are being developed in the field of hardware which will become the platform of multimedia. This type of hardware is designed to implement complex and sophisticated image processing in order to satisfy the needs of program software. Especially, in the video entertainment systems, the demand for image processing ability having more realistic and dramatic effects has been increased to satisfy the user's growing need.

The prior image processing technique is as follows. According to the prior art of the image processing system used in a video entertainment system, the background image where the surface of the land or the sea, the sky, or the space is displayed is combined with the foreground image where the character of the game is displayed, and the composite image is displayed on the monitor screen of the display. When a game player plays the game, the foreground image or background image is moved to show the motion of the character. That is, the foreground image is moved or rotated with the background image fixed or, conversely, the background image is moved or rotated with the foreground image fixed. The latter function is called the scroll function.

In addition to the scroll function described above, an image processing system has other functions such as the window function and the priority function. The following describes these functions.

[Window function and priority function]

The following is a brief description of the window function and the priority function. Recently, more and more data has to be displayed on one monitor screen. To meet this need, the window function has been introduced; it divides the screen into one or more transparent image areas, called windows, and displays different types of data in each window. Windows are normally overlapped with the background image or with other windows. And, among a plurality of overlapping windows, only one window is displayed on top of the others according to the specified priority. This priority is determined by the priority function. The priority function plays an important role in today's image processing technique; that is, it not only determines the priority when windows are displayed and displays windows but also determines the priority between the background image and the fore ground image or the priority among a plurality of foreground images of various types.

[Graphical image displayed by the scroll function]

The following is a description of the scroll function. The scroll function moves the background image while keeping the foreground image, containing the character, near the center of the display screen. Moving the background image does not mean the transformation of image information (that is, the background image itself is not moved); the background image is a virtual static image stored in the image memory of the image processing system. More precisely, we can say that a display screen frame or a player's viewpoint simply moves around the whole background image stored in an image memory as a result of actual calculation. Strictly speaking, a display screen is a virtual screen set up for each circuit which performs movement transformation or rotation transformation. However, in the following discussion, a display screen may be thought of as the monitor screen of a display because it is the screen on which images are displayed.

[Scroll screen configuration]

There are two types of scroll screen formats: the cell format used on a home video entertainment system and the bit mapped format used on a personal computer. To display a cell format scroll screen on the display screen, a plurality of cell patterns, the same displayed as necessary, for example, each consisting of 8×8 pixels are combined and displayed on the display screen as background image data. The pattern data of a cell-image and the display screen location of a cell image are specified by data called pattern name data.

[Display control of the scroll screen on a video entertainment system]

Normally, a video entertainment system having an image processing system has a CPU which controls the whole video entertainment system as well as image memory which contains image information. Pattern name data and cell-image pattern data are stored in video RAM (hereafter called VRAM) which is used as image memory. That is, when a video entertainment system displays a background image, VRAM contains image information, which has been read from a cassette ROM or a CD-ROM under control of the CPU, or image information which has been processed by the CPU. The video entertainment system first reads pattern name data from VRAM and, based on the pattern name data that has been read, accesses VRAM again to read the pattern data of the cell image to display the background image on the display screen (more specifically, on the monitor screen).

There are two types of scroll screens: one is a normal scroll screen which is moved up or down and right or left, and the other is a rotation scroll screen which is rotated. On the scroll screen, it is possible to predict pattern data and pattern name data to be used and, therefore, it is possible to access pattern data and pattern name data which are stored beforehand in VRAM. On the rotation screen, however, it is impossible to predict pattern data and pattern name data to be used. This means that pattern data and pattern name data must be stored in VRAM on a dot basis.

[Relation among a character, rotation scroll screen, and VRAM]

The image data (called pattern data) of a character (for example, an airplane in a flight simulator) to be displayed in the foreground is stored in VRAM on a dot basis. Thus, to display the character on the display screen, the video entertainment system accesses VRAM, one dot at a time.

In this case, to superimpose a character (foreground) on the rotation scroll screen (background), it is necessary to access VRAM to read both pattern name data and pattern data, one dot at a time. This means that VRAM for storing pattern name data must be physically independent of VRAM for storing pattern data. More specifically, a video entertainment system with two rotation scroll screens must have a total of four VRAM areas: two VRAM areas for storing pattern name data and two VRAM areas for storing pattern data.

[Calculation of standard scroll screen display control]

To move and scroll the scroll screen that is used as the background image, the following method is used:

1 From the movement rotation formula, calculate the X and Y coordinates of the starting point (leftmost end) of each line in the background image and the horizontal increments Δ X and Δ Y.

2 Add the horizontal increments Δ X and Δ Y to the X and Y coordinates of the start point of each line on a dot basis.

3 Calculate the position coordinates of each pixel.

4 Generate the image data in the background image by accessing image memory to get the address corresponding to this position coordinates.

In practice, screen coordinates are calculated under program control as shown below to find the starting coordinates (GXst, GYst) and the horizontal coordinate increments Δ GX and Δ GY.

$$Xs - Xp = A\{(Xst + \Delta Xst \times Vcnt) - Px\} +$$
$$B\{(Yst + \Delta Yst \times Vcnt) - Py\} +$$
$$C\{Zst - Pz\}$$
$$Ys - Yp = D\{(Xst + \Delta Xst \times Vcnt) - Px\} +$$
$$E\{(Yst + \Delta Yst \times Vcnt) - Py\} +$$
$$F\{Zst - Pz\}$$
$$Xp = A(Px - Cx) + B(Py - Cy) + C(Pz - Cz) + Cx + Mx$$
$$Yp = D(Px - Cx) + E(Py - Cy) + F(Pz - Cz) + Cy + My$$
$$dX = A \times \Delta X = B \times \Delta Y$$
$$dY = D \times \Delta X = E \times \Delta Y$$

A, B, C, D, E, F: Rotation matrix parameters

Px, Py, Pz: Viewpoint coordinates

Xp, Yp, Zp: Viewpoint coordinates after rotation transformation

Xs, Ys, Zs: Screen coordinates after rotation transformation

Xst, Yst, Zst: Start coordinates on the display screen

Δ Xst, Δ Yst: Vertical coordinate increment on the display screen

Δ X, Δ Y: Horizontal coordinate increment on the display screen

Vcnt: V count value (monitor screen vertical coordinate value)

$$GXst=k(Xs-Xp)+Xp$$
$$GYst=k(Ys-Yp)+Yp$$
$$\Delta\ GX=k\times dX$$
$$\Delta\ GY=k\times dY$$

In the above formulas, k is a perspective coefficient.

By writing the calculated four values into the image processing system, the image processing system adds Δ GX and Δ GY to GXst and GYst, respectively, for each dot to find the scroll screen coordinates.

This calculation requires a large matrix operation circuit including a multiplier. To keep the circuit small, the above calculation is usually performed by a software routine.

In the above technique, the following problems must be solved:

[Problem 1: It is difficult to generate a variety of image data without increasing the amount of image memory.]

Today, a video entertainment system must be capable of displaying life-like, complex images. For example, as a variation of a rotation scroll screen, an image produced by rotating an original background image in VRAM clockwise and another image produced by rotating the same original background image counter-clockwise are combined into one background image. In such a case, image data produced by rotating the original data clockwise and image data produced by rotating the original data counter-clockwise are generated separately. Therefore, the video entertainment system must access VRAM to read pattern name data each time image data is generated, and must perform rotation processing for the pattern data of each cell image. Because this method requires two separate VRAM accesses, the access time becomes longer and display data is sometimes not available when it is required.

To solve this problem, two background images—clockwise rotation image and counter-clockwise rotation image—are stored in VRAM beforehand, and the pattern data and pattern name data are read according to the clockwise and counter-clockwise rotation coordinate values. However, it requires more VRAM (i.e., a plurality of physically-independent VRAM areas or an increased amount of VRAM).

[Problem 2: The display of the scroll screen increases the CPU load]

As the background image is moved or rotated, the start point of the X and Y coordinate values and the horizontal increments Δ X and Δ Y must be calculated for line by line. Calculation of movement and rotation requires a large CPU overhead. This increases the CPU load, limiting the amount of work the CPU does for other jobs.

[Problem 3: A video entertainment system capable to perform the 3-axis rotation of the scroll screen]

In the conventional method for controlling a scroll screen, the increments Δ X and Δ Y of each line on the display screen are constant. Therefore, it is impossible to rotate an image on three axes (X-axis, Y-axis, and Z-axis) at the same time; that is, the background image cannot be tilted during display so that the right end is away from (or near to) the left end. Because of this, the display ability of the scroll screen is limited.

[Problem 4: A need for a variety of window displays]

In the conventional window display method used on a video entertainment system, two types of window are available: a rectangle window which is displayed according to two specified points, and a line window which is displayed according to two specified points on a line. However, these windows are simple in shape and, so, it is impossible to display various types of windows.

In view of the problems given above, it is the main object of this invention to provide an image processing system for generating a variety of split screen image data as well as its method and to provide an electronic system having an image processing system which achieves this object.

A first object of this invention is to provide an image processing system for preventing the CPU load from increasing and for creating various split-screen displays through the efficient use of image memory.

A second object of this invention is to provide an image processing system for implementing various types of transformation while keeping the CPU load to a minimum by performing movement transformation processing and/or rotation transformation processing in special operation circuits. A third object of this invention is to provide an image processing system capable of creating highly efficient split-screen display. A forth object of this invention is to provide an image processing system for reducing the time spent in generating display image data.

A fifth object of this invention is to provide an image processing method for preventing the CPU load from increasing and for creating various split-screen displays through the efficient use of image memory. A sixth object of this invention is to provide an electronic system, especially a video entertainment system, for preventing the CPU load from increasing and for creating various split-screen displays through the efficient use of image memory.

A seventh object of this invention is to provide an electronic system, especially a video entertainment system, which have the CPU, two pairs of video processors, and VRAM and which can create various split-screen displays. An eighth object of this invention is to provide an electronic system, suitable for use on a video entertainment system, which generates a sprite image and a background image, for reducing the CPU load and for displaying various split-screen displays through the efficient use of image memory.

A ninth object of this invention is to provide an electronic system, suitable for use on a video entertainment system, which is capable of creating various split screen displays through the efficient use of image memory and window display of any shape. A tenth object of this invention is to provide an electronic system, especially suitable for use on a video entertainment system, which can create a window of any shape.

An eleventh object of this invention is to provide an image processing system which can generate image data as if it was generated through 3-axis rotation and which can reduce the CPU overhead. A twelfth object of this invention is to provide an electronic system, especially suitable suitable for use on a video entertainment system, which can generate image data as if it was created through 3-axis rotation and which can reduce the CPU overhead.

A thirteenth object of this invention is to provide an electronic system which is suitable for a video entertainment system for achieving the above objects and which is provided with a display device.

A fourteenth object of this invention is to provide an image processing system which can achieve above objects and which can be packaged on a semiconductor board. In particular, a fifteenth object of this invention is to provide an image processing system which has color RAM and which achieves the object described in the fourteenth object. A sixteenth object of this invention is to provide an image processing system which achieves the above described objects and which has control registers and window control blocks which can be modified by the CPU. A seventeenth object of this invention is to provide an image processing system which achieves the above objects and whose image processor for generating background images can be packaged on one semiconductor board.

An eighteenth object of this invention is to provide an image processing system which processes rotation processing on the display screen at a high speed and which can react to a video entertainment system player's action in real time. A nineteenth object of this invention is to provide an image processing system which can generate image data as if 3-axis rotation was performed on the image. A twentieth object of this invention is to provide an image processing method for creating various types of screen displays.

SUMMARY OF THE INVENTION

[Configuration of the Invention]

To achieve the above object, an image processing system accesses image memory containing image information and sequentially reads image information about an image to be displayed and which generates image data according to the image information under control of the CPU, comprising: a plurality of signal processing means for outputting transformation processing signals necessary for executing transformation processing, such as movement transformation processing and/or rotation transformation processing, on the image information; a switching means, connected to a plurality of the signal processing means, for selecting and outputting one of the transformation processing signals according to a display switching signal preset for each pixel; and an address generation means, connected to the switching means, for generating a read address corresponding to image information which has been transformed based on the transformation processing signal.

An image processing system is an image processing system, wherein each of the signal processing means comprise a parameter register for storing parameters used for performing movement transformation processing and/or rotation transformation processing; a matrix operation circuit for performing movement transformation processing and/or rotation transformation processing using the parameters; a coefficient RAM for storing data as coefficients; and a coefficient RAM access circuit for accessing the coefficient RAM and for calling the coefficients.

An image processing system is an image processing system, wherein the display switching signal is sent from one of the coefficient RAMs to the switching means.

An image processing system is an image processing system, wherein the address generation means comprises an AND/OR operation circuit connected to the switching means; and an image memory access circuit connected to the AND/OR operation circuit.

An image processing processing method is an image processing method for accessing the image memory and sequentially reading image information about an image to be displayed and for generating image data according to corresponding image information. The image processing method comprises the steps of: generating transformation processing signals necessary for executing transformation processing for the image information; selectively switching the transformation processing signals according to a display switching signal preset for each pixel and then outputting one of transformation processing signals; generating a read address for image information which has been transformed according to the transformation processing signal; and displaying a plurality of independent images on splitted areas of screen according to the display switching signal.

An electronic system comprises (1) a CPU; (2) a video RAM containing image information; and (3) a video processor for accessing the image information and sequentially reading image information about an image to be displayed and, under control of the CPU, for generating image data comprising: a background image generation section and a display control section connected to a corresponding background image generation section, wherein the background image generation section includes the following 1 to 3:

1 a plurality of signal processing means for outputting transformation processing signals necessary for executing transformation processing on the image information;

2 a switching means, connected to a plurality of the signal processing means, for selecting and outputting one of the transformation processing signals according to a pre-set display switching signal; and 3 an address generation means, connected to the switching means, for generating a read address corresponding to image information which has been transformed based on the transformation processing signal sent from the switching means.

An electronic system comprising: (1) a CPU; (2) a first video processor; (3) a first video RAM, connected to the first video processor, for storing image information; (4) a second video processor including a background image generation section and a display control section connected to the background image generation section; and (5) a second video RAM, connected to the second video processor, for storing image information, wherein the background image processing section includes the following 1 3:

1 a plurality of signal processing means for outputting transformation processing signals necessary for executing transformation processing on the image information according to provided information under control of the CPU;

2 a switching means, connected to a plurality of the signal processing means, for selecting and outputting one of the transformation processing signals according to a pre-set display switching signal; and 3 an address generation means, connected to the switching means, for generating a read address corresponding to image information which has been transformed according to the transformation processing signal.

An electronic system comprising: (1) a CPU; (2) a bus line connected to the CPU; (3) a bus controller for controlling the flow of signals on the bus line; (4) a first image information processing section including the following 1) to 3):

1) a first video processor, connected to the bus line, for controlling the generation of sprite image data;

2) a first video RAM, connected to the first video processor, for storing image information for generating the sprite image data; and 3) a frame buffer for expanding the sprite image data, and (5) a second image information processing section including the following 1) and 2):

1) a second video processor connected to the bus line including: a background image processing section, for generating background image data; and a display control section, connected to the background image generation section and to the first image processing section, for controlling the image data in order to combine the sprite image data and the background image data; and 2) a second video RAM, connected to the second video processor, for storing image information for generating background image data, wherein the background image processing section includes the following 1–3:

1 a pair of signal processing means, connected to the bus line, for outputting transformation processing signals necessary to perform transformation processing on image information according to provided information under control of the CPU;

2 a switching means, connected to a plurality of the signal processing means, for selecting and outputting one of the transformation processing signals according to a pre-set display switching signal; and 3 an address generation means, connected to the switching means, for generating a read address corresponding to image information which has been transformed according to the transformation processing signal output from the switching means.

An electronic system, wherein the first video processor includes a bit value change means for reading sprite image data expanded in the frame buffer, changing the value of a specified bit of the image data, and then writing the image data back at the same address in the frame buffer, and the second video processor includes: a bit value detection section for detecting whether or not the value of the specified bit contained in sprite image data expanded in the frame buffer has been changed; and a window control section for sending the sprite image data to the display control section as a window signal of a sprite image shape according to the value of the changed bit.

An electronic system comprises (1) a CPU; (2) a bus line connected to the CPU; (3) a bus controller for controlling signals on the bus line; (4) a first video information processing section including the following 1)–4):

1) a first video processor, connected to the bus line, f or controlling the generation of sprite image data ;

2) a first video RAM, connected to the first video processor, for storing image information for generating the sprite image data;

3) a frame buff er for expand ing the sprite image data; and 4) a bit value change means for reading sprite image data expanded in the frame buffer, changing the value of a specified bit of the image data, and then writing the image data back at the same address in the frame buffer, (5) a second image information processing section including the following 1)–3):

1) a second video processor, connected to the bus line, for generating background image data;

2) a second video RAM, connected to the second video processor, for storing image information for generating background image data; and 3) a display control section for controlling the image data in order to combine the sprite image data and the background image data, wherein the second video processor includes the following 1 and 2:

1 a bit value detection section for detecting whether or not the value of the specified bit contained in sprite image data read from the frame buffer has been changed; and 2 a window control section for sending the sprite image data to the display control section as a window signal of a sprite image shape according to the value of the changed bit.

An image processing system represents a viewpoint after coordinate transformation (Xp, Yp, Zp) and a specified point on a display screen after coordinate transformation (Xs, Ys, Zs) using the following formulas (1) and (2), where A–I are rotation matrix parameters, (Px, Py, Pz) is a viewpoint toward a display screen before coordinate transformation, (Cx, Cy, Cz) is a central point of coordinate transformation, (Sx, Sy, Sz) is a specified point on a display screen before coordinate transformation, and (Mx, My, Mz) is a parallel displacement amount, $$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

for representing the coordinates X and Y of a point on a scroll screen on which a screen that has been transformed to the above formulas (1) and 2) is displayed using the following formulas, $X = k(Xs - Xp) + Xp$ $Y = k(Ys - Yp) + Yp$ $k = -Zp/(Zs - Zp)$ \hfill (4)

for accessing image memory with the use of the coordinates X and Y, and for generating data of an image to be displayed after coordinate transformation, comprising:

coefficient memory for storing coefficient k for one screen on a pixel basis;

a matrix operation circuit for performing the calculation of the formula (1) and the formula (2) to find Xp, Yp, Xs, and Ys of each pixel; and an AND/OR operation circuit for performing the calculation of the formula (4) using Xp, Yp, Xs, and Ys of the pixel and the coefficient k of the corresponding pixel read from the coefficient memory to find coordinates X and Y.

An electronic system comprises (1) a CPU; (2) a video processor; and (3) a video RAM, connected to the video processor, for storing image information, characterized in that image data is generated by accessing signals stored in the video RAM and sequentially reading image information of an image to be displayed, wherein the video processor includes: 1) a background image generation section; and 2) a display control section connected to the background image generation section, wherein the background image generation section includes the following 1–4:

1 a parameter register for storing signals of rotation matrix parameters A–F supplied from the CPU as well as coordinate data before transformation Px, Py, Pz, Cx, Cy, Cz, Mx, My, and Mz, in which a viewpoint after coordinate transformation (Xp, Yp, Zp) and a specified point on a display screen after coordinate transformation (Xs, Ys, Zs) are represented by the following formulas:

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

where (Px, Py, Pz) is a viewpoint before coordinate transformation, (Cx, Cy, Cz) is a central point of coordinate transformation, (Sx, Sy, Sz) is a specified point on a display screen before coordinate transformation, and (Mx, My, Mz) is a parallel displacement amount, and the coordinates X and Y of a point on a background screen on which a screen that has been transformed according to the above formulas is displayed are represented by the following formulas:

$$X = k(Xs - Xp) + Xp$$
$$Y = k(Ys - Yp) + Yp \quad (4)$$

2 Coefficient memory for storing coefficient k, supplied from the CPU, for each pixel;

3 a matrix operation circuit, connected to the parameter register, for calculating Xp, Yp, Xs, and Ys of each pixel by performing matrix operation of formula (1) and formula (2); and 4 an AND/OR operation circuit for performing the calculation of formula (4) with the use of Xp, Yp, Xs, and Ys of the pixel and the coefficient k of the corresponding pixel read from the coefficient memory to find coordinates X and Y and then generating a read address in the video RAM.

An electronic system comprises a display device for displaying an image according to image data generated from image information.

An image processing system comprises (1) a first terminal for accepting signals from a CPU;

(2) a second terminal for connecting a video RAM in which image information is stored;

(3) a third terminal for outputting image data; and (4) a display image generation block including the following circuits 1)–5):

1) a parameter register, connected to the first terminal, for storing signals of rotation matrix parameters A–F supplied from the CPU, a viewpoint before coordinate transformation (Px, Py, Pz), the central point of coordinate transformation (Cx, Cy, Cz), and a parallel displacement amount (Mx, My, Mz);

2) a matrix operation circuit, connected to the parameter register, for executing the operation of the following formulas (1) and (2) to find Xp, Yp, Xs, and Ys of each pixel:

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

where, (Sx, Sy, Sz) is a specified point on the display screen before coordinate transformation, (Xp, Yp, Zp) is a viewpoint after coordinate transformation, and (Xs, Ys, Zs) is a specified point on a display screen after coordinate transformation, respectively;

3) coefficient memory, connected to the first terminal, for storing signals of coefficient k supplied from the CPU;

4) an AND/OR operation circuit for performing the following operation (4) using Xp, Yp, Xs, and Ys of each pixel supplied from the matrix operation circuit and coefficient k corresponding to each pixel read from the coefficient memory to find coordinates X and Y of a display image;

$$X = k(Xs - Xp) + Xp$$
$$Y = k(Ys - Yp) + Yp \quad (4)$$

5) A video RAM access circuit, connected to the second terminal, for accessing the video RAM using coordinates X and Y supplied from the AND/OR operation circuit as a pixel address, (5) a display control block, connected to the display image generation block, for outputting generated image data from the third terminal.

An image processing system comprises (1) a first terminal for accepting signals from a CPU;

(2) a second terminal for connecting a video RAM where image information is stored;

(3) a third terminal for outputting image data;

(4) a display image generation block including the following circuits 1)–8):

1) a pair of parameter registers, connected to the first terminal, for storing signals representing rotation parameters supplied from the CPU, a viewpoint before coordinate transformation, a central point of coordinate transformation, and an parallel displacement amount;

2) a pair of matrix operation circuits, each connected to the corresponding parameter register, for calculating a viewpoint and a point on a display screen after coordinate transformation for each pixel of a pair of images;
3) a pair of coefficient memories, connected to the first terminal, for storing coefficient k containing a display switching signal supplied from the CPU;
4) a first switching circuit connected to the both of the pair of matrix operation circuits;
5) a second switching circuit connected to the both of the pair of coefficient memory;
6) an AND/OR operation circuit, connected to the first and second switching circuits, for calculating the coordinates of a display image according to signals supplied from the first and second switching circuits;
7) a switching means for supplying the display switching signal from one of the coefficient memories to the first and second switching circuits and to AND/OR operation circuit and for switching signals sent from the pair of matrix operation circuits and the pair of coefficient memories to the AND/OR operation circuit; and
8) a video RAM access circuit, connected to the second terminal, for accessing a video RAM using coordinate data supplied from the AND/OR operation circuit as the pixel address of a display image, (5) a display control block, connected to the display image generation block, for outputting generated image data from the third terminal.

An image processing system wherein a color RAM is connected to the display control block.

An image processing system comprising: a control register, connected to the first terminal, the contents of which may be re-written by the CPU; and a window control block for supplying control signals to the display control block.

An image processing system wherein the display image generation block, the window control block, and the display control block are integrated on a semi-conductor board as a video processor IC.

An image processing system comprising: a fourth terminal for accepting a foreground image; and a window detection block connected between the fourth terminal and the window control block, wherein a signal sent to the fourth terminal contains a window control flag and foreground image signal, the window control flag is supplied to the window detection block, and the foreground image signal is supplied to the display control block.

An image processing system wherein the display image generation block generates background images corresponding to the foreground images, and the display control block outputs image data combining the background images and the foreground images from the fourth terminal.

An image processing system wherein the display image generation block, the window control block, the display control block, and the window detection block are integrated on a semiconductor board as a video processor IC.

An image processing method comprising the steps of: representing a viewpoint after coordinate transformation (Xp, Yp, Zp) and a specified point on a display screen after coordinate transformation (Xs, Ys, Zs) using the following formulas (1) and (2), where A–I are rotation matrix parameters, (Px, Py, Pz) is a viewpoint toward a display screen before coordinate transformation, (Cx, Cy, Cz) is a central point of coordinate transformation, (Sx, Sy, Sz) is a specified point on a display screen before coordinate transformation, and (Mx, My, Mz) is a parallel displacement amount;

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

representing the coordinates X and Y of a point on a scroll screen on which a screen that has been transformed according to the above formulas (1) and (2) is displayed, using the following formulas;

$$X = k(Xs - Xp) + Xp$$

$$Y = k(Ys - Yp) + Yp$$

$$k = -Zp/(Zs - Zp) \quad (4)$$

performing the formula (4) to find coordinates X and Y using the coefficient k for one screen preset for each pixel and Xp, Yp, Xs, and Ys of each of the pixel; accessing image memory with the use of the coordinates X and Y; and generating data of an image to be displayed after coordinate transformation, wherein "X-axis rotation+Z-axis rotation" in which X-axis rotation on the X axis of a display screen and Z-axis rotation on the Z-axis of a display screen are successively done and/or "Y-axis rotation+Z axis rotation" in which Y-axis rotation on the Y-axis of a display screen and Z-axis rotation on the Z-axis of a display screen are successively done is performed.

An image processing method comprising the steps of: representing a viewpoint after coordinate transformation (Xp, Yp, Zp) and a specified point on a display screen after coordinate transformation (Xs, Ys, Zs) using the following formulas (1) and (2), where A–I are rotation matrix parameters, (Px, Py, Pz) is a viewpoint toward a display screen before coordinate transformation, (Cx, Cy, Cz) is a central point of coordinate transformation, (Sx, Sy, Sz) is a specified point on a display screen before coordinate transformation, and (Mx, My, Mz) is a parallel displacement amount;

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

representing the coordinates X and Y of a point on a scroll screen on which a screen that has been transformed according to the above formulas (1) and (2) is displayed, using the following formulas;

$$X = k(Xs - Xp) + Xp$$

$$Y = k(Ys - Yp) - Yp$$

$$k = -Zp/(Zs - Zp) \quad (4)$$

performing the formula (4) to find coordinates X and Y using the coefficient k for one screen preset for each pixel and Xp, Yp, Xs, and Ys of each of the pixel; accessing image memory with the use of the coordinates X and Y; and generating data of an image to be displayed after coordinate transformation, wherein "X-axis rotation+screen-axis rotation" in which X-axis rotation on the X-axis of a display screen and screen-axis rotation on the screen-axis of a display screen are successively done and/or "Y axis rotation+screen-axis rotation" in which Y-axis rotation on the Y-axis of a display screen and the screen-axis rotation are successively done is performed.

An image processing method comprising the steps of: representing a viewpoint after coordinate transformation (Xp, Yp, Zp) and a specified point on a display screen after coordinate transformation (Xs, Ys, Zs) using the following formulas (1) and (2), where A–I are rotation matrix parameters, (Px, Py, Pz) is a viewpoint toward a display screen before coordinate transformation, (Cx, Cy, Cz) is a central point of coordinate transformation, (Sx, Sy, Sz) is a specified point on a display screen before coordinate transformation, and (Mx, My, Mz) is a parallel displacement amount;

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

representing the coordinates X and Y of a point on a scroll screen on which a screen that has been transformed according to the above formulas (1) and (2) is displayed, using the following formulas;

$$X = k(Xs - Xp) + Xp$$

$$Y = k(Ys - Yp) + Yp$$

$$k = -Zp/(Zs - Zp) \quad (4)$$

performing the formula (4) to find coordinates X and Y using the coefficient k for one screen preset for each pixel and Xp, Yp, Xs, and Ys of each of the pixel; accessing image memory with the use of the coordinates X and Y; and generating data of an image to be displayed after coordinate transformation, wherein, scaling in the horizontal direction or in the vertical direction of the display screen is done by accumulating the coefficient k in either X or Y in the above formula (4).

An image processing method comprising the steps of: representing a viewpoint after coordinate transformation (Xp, Yp, Zp) and a specified point on a display screen after coordinate transformation (Xs, Ys, Zs) using the following formulas (1) and (2), where A–I are rotation matrix parameters, (Px, Py, Pz) is a viewpoint toward a display screen before coordinate transformation, (Cx, Cy, Cz) is a central point of coordinate transformation, (Sx, Sy, Sz) is a specified point on a display screen before coordinate transformation, and (Mx, My, Mz) is a parallel displacement amount;

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

representing the coordinates X and Y of a point on a scroll screen on which a screen that has been transformed according to the above formulas (1) and (2) is displayed, using the following formulas;

$$X = k(Xs - Xp) + Xp$$

$$Y = k(Ys - Yp) + Yp \quad (4)$$

performing the formula (4) to find coordinates X and Y using the coefficient k for one screen preset for each pixel and Xp, Yp, Xs, and Ys of each of the pixel; accessing image memory with the use of the coordinates X and Y; and generating data of an image to be displayed after coordinate transformation, wherein image data is generated so that the display screen looks curved by varying the coefficient k according to the vertical coordinate value and the horizontal coordinate value of the display screen.

[Effects of the Invention]

An image processing system which is constructed as described above, can generate image data through mutually-independent transformation. This can be done by switching the output from the switching means according to the display switching signal and by selectively sending address generation data for use in different movement/rotation transformation to the address generation means. Therefore, the monitor screen can be split according to the display switching signal and, to each of those split screens, independent image data may be supplied. This makes it possible to display an independent image on each of these split screens.

The invention stores the movement transformation and/or rotation transformation parameters from the CPU into the register, stores CPU-calculated data (or data read from a cassette or CD-ROM under control of the CPU) into the coefficient RAM for use as coefficients and, using these coefficients, causes the matrix operation circuit and the AND-OR operation circuit, not the CPU, to perform movement transformation and/or rotation transformation. The AND-OR operation circuit need only to process data to be displayed on the screen indicated by the switching circuit; for example, it need not perform calculation on underlying screen data. This reduces the CPU load because it only has to set the parameters required for the operation. The invention which uses one of the coefficients stored in the coefficient R4 as the display switching signal, makes the split-screen display easier. The invention allows the image memory access circuit to access image memory as necessary according to the output from the AND-OR operation circuit, eliminating the need for access to underlying screens. This increases the speed of display image data generation.

The invention allows a sprite image of any shape to be used as a window. This makes it possible to split one monitor screen into a plurality of portions of any shape to generate a new image.

With the invention, it is possible calculate scroll screen coordinates X and Y according to a specified calculation formula and, therefore, can generate image data as if it was created through 3-axis rotation. The Invention can inventions also store one-screen coefficient k into the coefficient memory and, using these coefficients, process data with the use of the matrix operation circuit and the AND-OR operation circuit, thus reducing the CPU overhead. The invention allows an electronic system suitable for a video entertainment system to have this effect. The invention allows an electronic system, which can be used as a video entertainment system with a display such as an arcade video entertainment system, to have this effect.

The invention provides the effects described above and is composed of the circuits that can be packaged on one semiconductor board, can be applied to a variety of technical fields.

The invention makes the coefficient k constant with respect to either the display screen horizontal direction or the display screen vertical direction if the screen rotation transformation is performed as "X-axis rotation+Z-axis rotation" or as "Y-axis rotation+Z-axis rotation". Therefore, this reduces the load on the CPU, which performs rotation transformation, and increases the display screen rotation processing speed. This means that, if this image processing method is used for an electronic system such as a video entertainment system, it makes it possible for the system to respond to a game player's action in real time.

The invention enables screen axis rotation to be performed after X-axis rotation or Y-axis rotation. With this capability, image data can be displayed as if it was rotated using three axes. In addition, if only the screen axis rotation is performed, the display screen is still constant with respect to either the horizontal direction or to the vertical direction. Thus, according to the invention, if a video entertainment system player performs screen-axis rotation on the character of a game, the character reacts to the player's operation in real time.

The invention makes it possible to scale an image horizontally or vertically by accumulating the coefficient k to one of X or Y in the formula (4).

The invention makes the coefficient k to become compatible with a condition which varies according to the vertical coordinate values or horizontal coordinate values on the display screen, thereby making the display screen look like a curved surface.

BRIEF DESCRIPTION OF DRAWINGS

FIG. 8 is the front view of the display screen shown in FIG. 1;

FIG. 9 is the front view of the display screen shown in FIG. 5;

FIG. 10 is the front view of the display screen shown in FIG. 6;

FIG. 11 is the front view of the display screen shown in FIG. 7;

FIGS. 20A, 20B, 21A, and 21B are diagrams explaining the rotation transformation of the display screen;

FIGS. 25 and 26 are circuit diagrams of other embodiments of this invention.

BEST MODE FOR CARRYING OUT THE INVENTION

Figure 1:
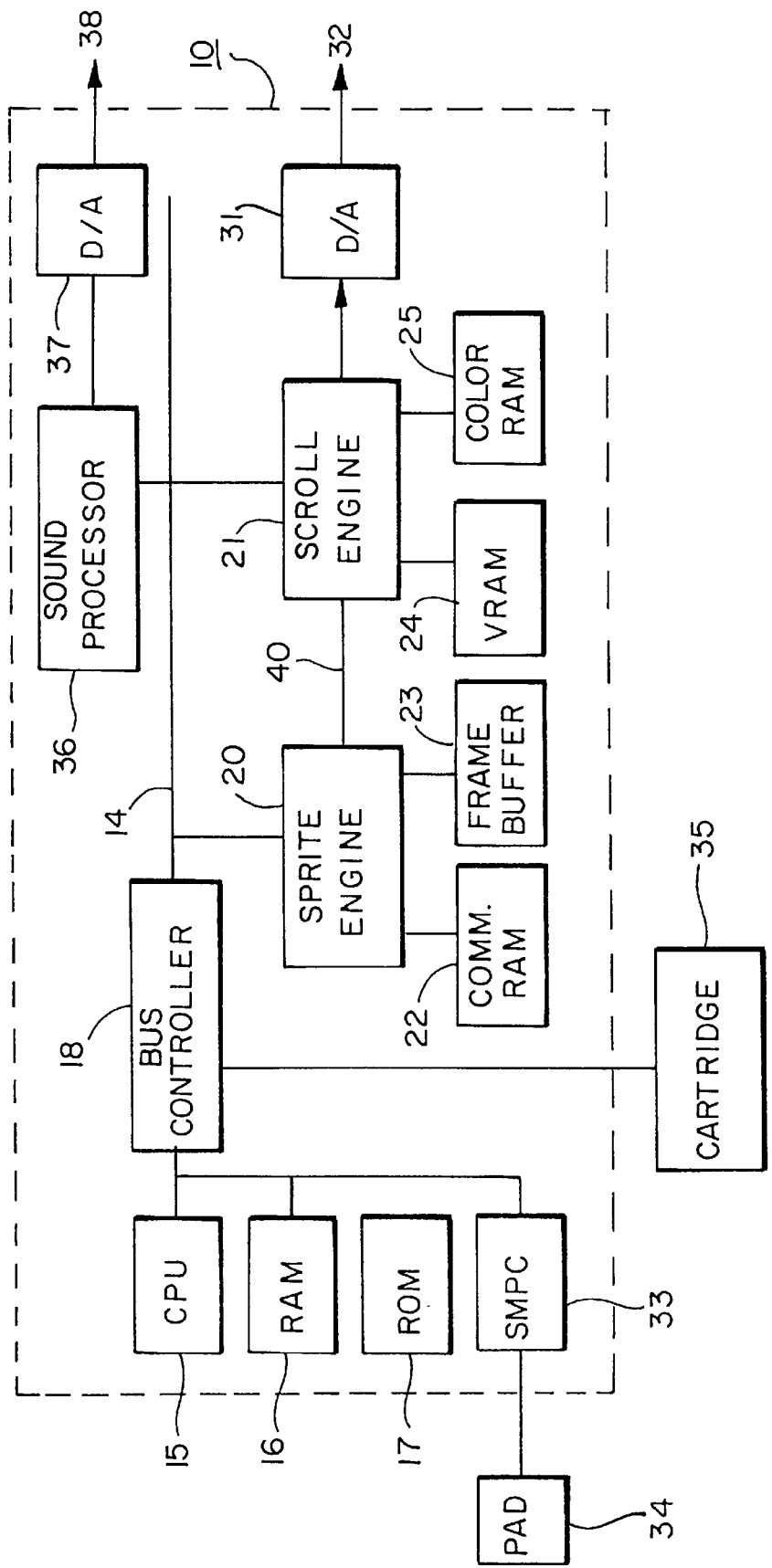
FIG. 1 is a block diagram of a video entertainment system used in an embodiment of this invention.

Referring to the drawings, the configuration of an embodiment of this invention is described more in detail.

I. Configuration of an Embodiment

The following describes an embodiment of a video entertainment system:

[Overall configuration of the video entertainment system 10]

Referring to the block diagram in FIG. 1, there is shown an overall configuration of the video entertainment system main unit 10. The frame 10 indicates the video entertainment system main unit. The control pad 34, which is an input device used by a player to control the game, is connected to the video entertainment system main unit 10 via the SMPC (System Manager & Peripheral Control) which acts as an I/O controller. The SMPC 33 performs the reset control of the entire video entertainment system 10 and controls the interface with external units such as the control pad 34. The removable cartridge 35 can be mounted on the video entertainment system main unit 10. The cartridge 35 contains a game program which is stored in the semiconductor memory (mask ROM). A CD-ROM drive (not shown in the diagram), if provided on the video entertainment system main unit 10, can read a game program from a CD-ROM.

The bus 14 is provided within the video entertainment system main unit 10, and the CPU 15, RAM 16, ROM 17, bus controller 18, and sound processor 36 are connected to it. The CPU 15, consisting of 32-bit RISC type high-speed CPUs (two CPU chips called SH-2), runs the game program stored in the cartridge 35 and, at the same time, controls the entire video entertainment system. The bus controller 18, provided with the DMA controller and the interrupt controller, acts as the co-processor of the CPU15. The sound processor 36 controls sounds (PCM/FM); it uses the D/A converter 37 to convert digital signals to analog signals to output sounds via the speaker (not shown in the diagram) Then, the following explains the sprite engine 20 and the scroll engine 21 connected to the bus 14.

[Sprite engine 20]

(1) Outline of the sprite engine 20

The sprite engine 20, to which the VRAM (or command RAM) 22 and the frame buffer 23 are connected, constitutes the first image information processing section for image processing of the sprite screen which is to be displayed in the foreground FG. The sprite engine 20, an IC chip called video processor 1 (hereafter called VDP1), is contained on the semiconductor chip. The command RAM 22 (consisting of 4M-bit DRAM) and the two-part frame buffer 23 (each consisting of 2M bits) are connected to the sprite engine 20. The command RAM 22 contains command data sent from the CPU 15 as well as image data which is the original of the foreground image. The image data of the sprite screen is expanded into the frame buffer 23.

The CPU 15 runs the program stored in the ROM 17 to send command data (drawing commands) to the sprite engine 20. Upon receiving this data, the sprite engine 20 writes this command data into the command data RAM 22 as a command table. Then, the sprite engine 20 selects and reads sprite screen image data, such as a character, from the command RAM 22 and, after performing rotation, enlargement, reduction, or color operation, writes the data to a specified address in the frame buffer 23 and, within the frame buffer 23, expands foreground image data. The sprite engine 20 reads image data sequentially from the frame buffer 23, one frame at a time, and sends it directly to the scroll engine 21 without using the bus 14. Drawing control data is set up in the system register in the sprite engine 20.

[Configuration of foreground image data]

Figure 2:
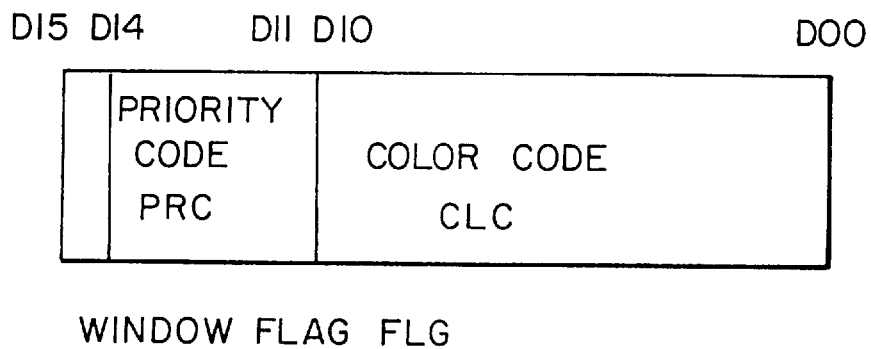
FIG. 2 shows a pixel of image data displayed as a foreground image.

As shown in FIG. 2, one piece of pixel data that is processed by the sprite engine 20 is represented in 16 bits. The low-order 11 bits, D0–D10, contain a color code specifying a color, and these 11 bits are used to represent an address within the color RAM 25 described later. A sprite character is stored in the VRAM 22 using 4 bits or 8 bits for a dot. When it is written into the frame buffer 23, the color RAM address offset value specified for each character is added to the high-order part of the character data. Bits D8–D10 or D5–D10 are reserved, and bits D11–D14 contain a priority code. When a plurality of images are overlapped, the priorities are compared on a pixel basis and a higher priority pixel is displayed.

[MSB-on function]

The sprite engine 20 has the MSB-on function. When the sprite engine writes a sprite character in a specified location in the frame buffer 23, it does the following in addition to writing the sprite character; that is, it reads data at the write address in the frame buffer, changes only the MSB (Most Significant Bit) from 0 to 1, then writes the data back to the same address. This function is called the MSB-on function. As shown in FIG. 2, the most significant bit (D15) of foreground image data used in this embodiment is the window flag. When this bit is 1, it indicates that the pixel is a window pixel; when this bit is 0, the pixel is not a window pixel. At this time, the dot data on which the MSB function is applied is used only to determine whether or not the dot data of the sprite character is transparent. It does not affect data that is written in the frame buffer 23.

Figure 13:
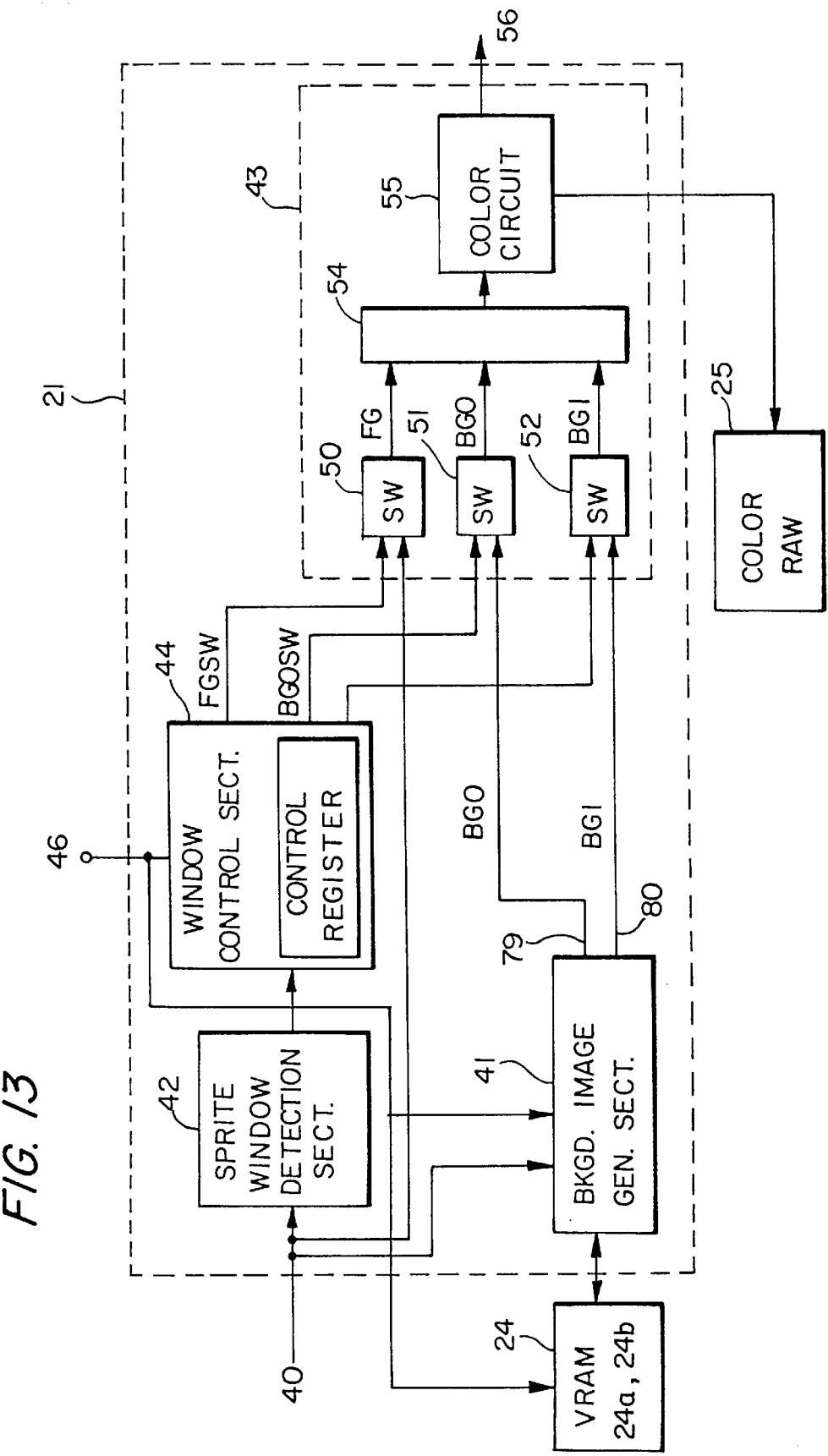
FIG. 13 is a block diagram of the scroll engine 21.

Foreground FG image data flows as follows: In FIG. 13, foreground FG image data is sent from the sprite engine 20 to the terminal 40. The most significant bit (D15) of the foreground image data (window flag) is sent to the sprite window detection section 42, and the remaining low-order 15 bits (D0–D14) containing a color code and a priority code are sent to the display control section 43. Upon detecting that the window flag is 1, the sprite window detection section 41 sends the detected signal to the window control section 44.

[An example of pixel data written in the frame buffer and MSB-on function]

Figure 3:
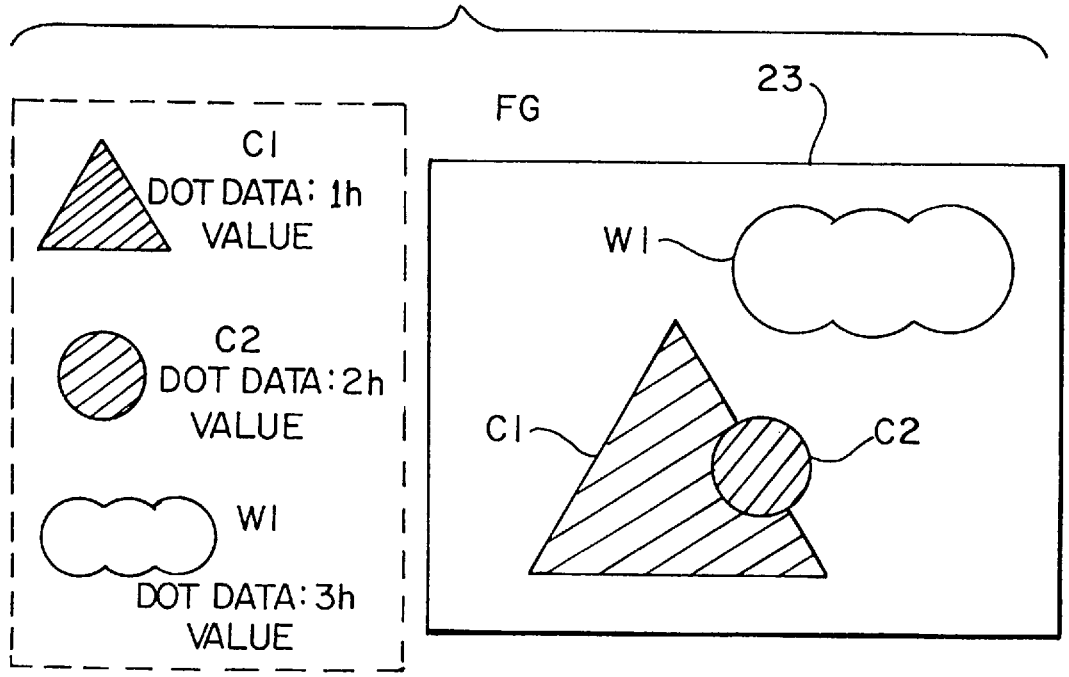
FIG. 3 is an example showing how pixel data is written into the frame buffer 23.

Referring to FIG. 3, there is shown how pixel data is written in the frame buffer. In this figure, the sprite characters C1, C2, and W1 are characters to be expanded in the foreground FG. They are of the shapes shown in the figure surrounded by dashed lines. Assume that characters C1, C2, and W1 have dot data values of 0001h, 0002h, and 0003h, respectively. Also assume that characters C1, C2, and W1 are written in the frame buffer 23 in this order.

When the sprite engine 20 writes pixel data in the frame buffer 23, the sprite engine 20 first clears the frame buffer to 0000h (16 bits/dot). Then, the sprite engine 20 writes sprite character C1, 0001h, at the specified location in the frame buffer 23 in the specified shape. And, then, the sprite engine 20 writes sprite character C2, 0002h, at the specified location in the frame buffer 23 in the specified shape.

When a window of the shape of sprite character W1 is prepared, the MSB-on function is specified beforehand for the sprite character W1. If it is specified, the sprite engine 20 reads frame buffer data according to the shape of the sprite character W1 and, after changing only the MSB of the data from 0 to 1, writes the data back to the same address. The frame buffer data thus obtained is read into the scroll engine 21 in synchronization with the horizontal and vertical synchronization signals of the scroll engine 21. In the scroll engine 21, the MSB of the frame buffer data, which is used as the window flag, is checked to determine whether to do window processing. Data in the remaining 15 bits (bits other than the MSB) is used as sprite dot data.

To set up a window of the shape of the sprite character C2, it is necessary to specify the MSB-on function beforehand as for the sprite character W1 and to write data at the specified location in the frame buffer 23 according to the shape of the sprite character C2 with the MSB value changed from 0 to 1.

[Scroll engine 21]

(1) Outline of the scroll engine 21

The scroll engine 21, to which the VRAM 24 and the color RAM 25 are connected, constitutes the second image information processing section for image processing of the scroll screen which is used as the background image. The scroll engine 21, an IC chip called video processor 2 (hereafter called VDP2), is contained on the semiconductor chip. This VDP2 chip contains the color RAM 25 (32K bits) containing color codes and a register (not shown in the diagram) in which data for generating image data is set. The VRAM 24, 4M bits or 8M bits in capacity, is also connected to the scroll engine 21.

The scroll engine 21 reads data from the VRAM 24 according to the setting in the register, determines the priority according to the setting in the image data register of the scroll screen, and generates image data. After generating image data, the scroll engine 21 converts image display data to display color data and outputs it to the display. Image data is defined in the VRAM 24 and color VRAM 25 by the CPU 15 via the bus controller 18.

(2) Configuration of VRAM 24

The VRAM 29 is used as follows: VRAM 24 is divided into two frames of the same capacity: VRAM 24a and VRAM 24b. The VRAM 24a and 24b each contain cell pattern data items, each consisting of 8×8 pixels, as well as pattern name data (VRAM address where pattern data is stored) indicating which cell is positioned at which address when 28×40 cells are used to create one frame of the background image.

(3) Scroll screen types

In this embodiment, there are two background images, BG0 and BG1, which can become rotation scroll screens. A rotation scroll screen refers to a scroll screen which rotates on coordinate axes (X, Y, and Z axes) and on a rotation axis which is right angles with the monitor screen.

(4) Relation among the scroll screen, display screen, and player's viewpoint

Figure 4:
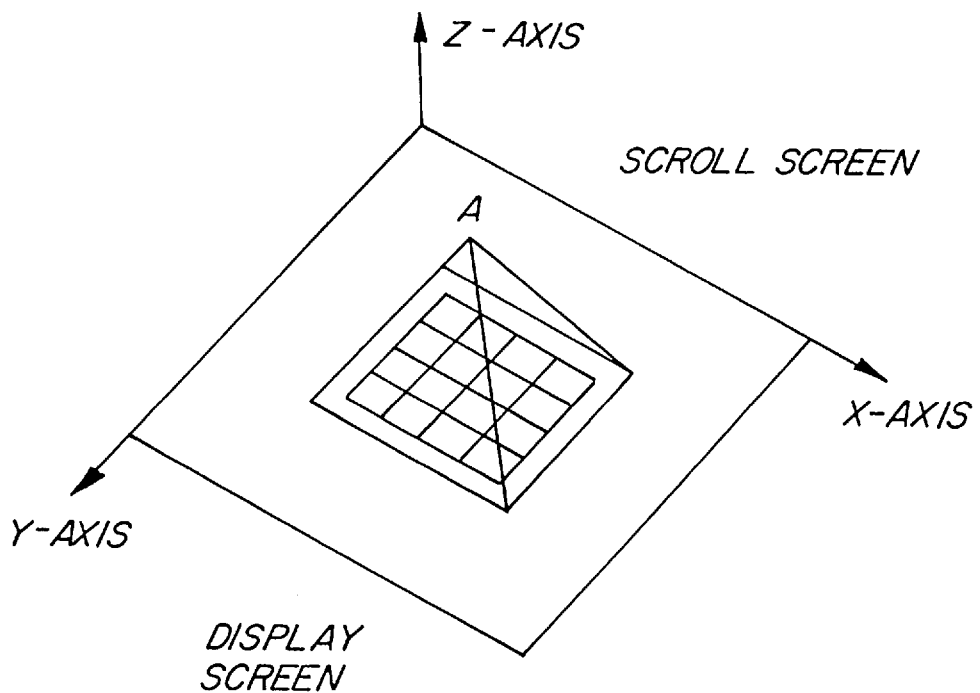
FIG. 4 is a perspective diagram showing the scroll screen, display screen, and player's viewpoint.
Figure 5:
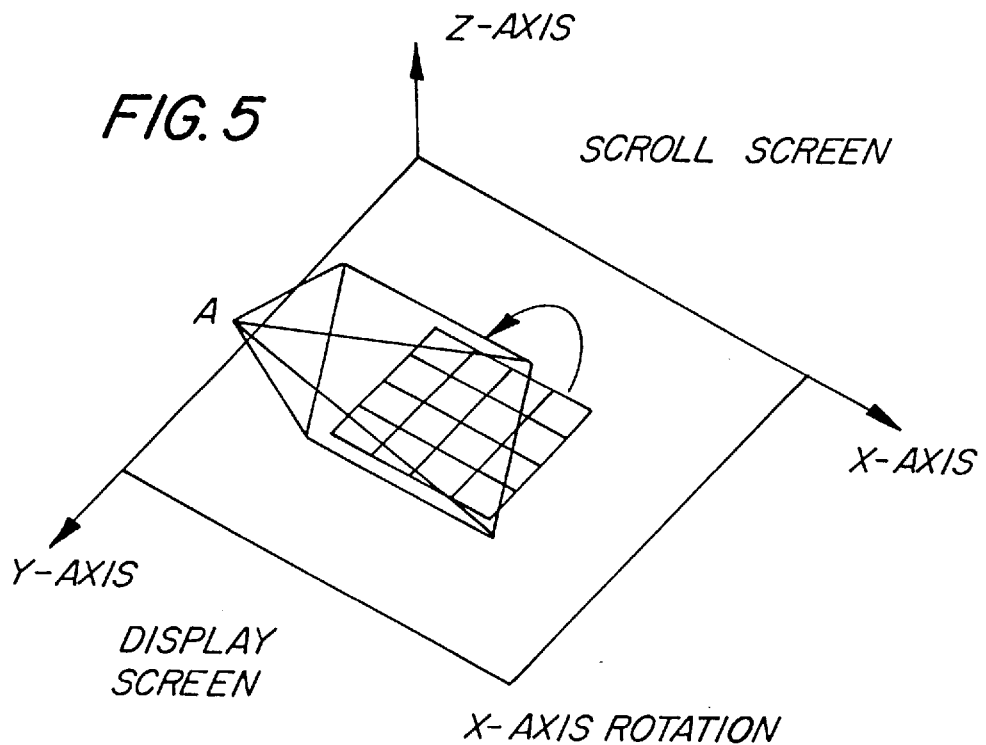
FIG. 5 is a perspective diagram showing the display screen in FIG. 4 that is rotated on the X-axis with respect to the scroll screen.
Figure 6:
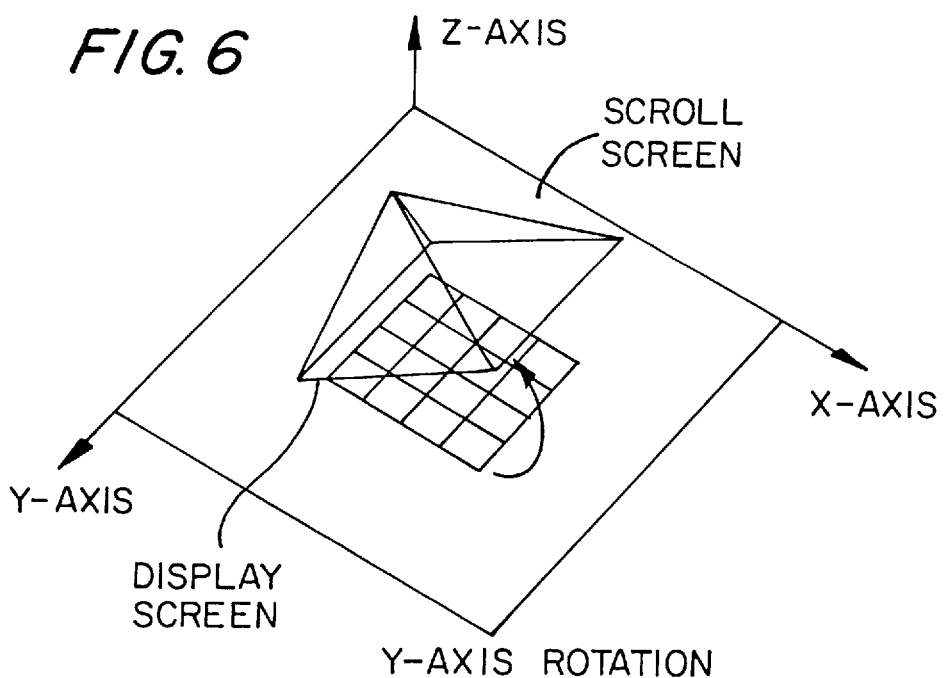
FIG. 6 is a perspective diagram showing the display screen in FIG. 4 that is rotated on the Y-axis with respect to the scroll screen.
Figure 7:
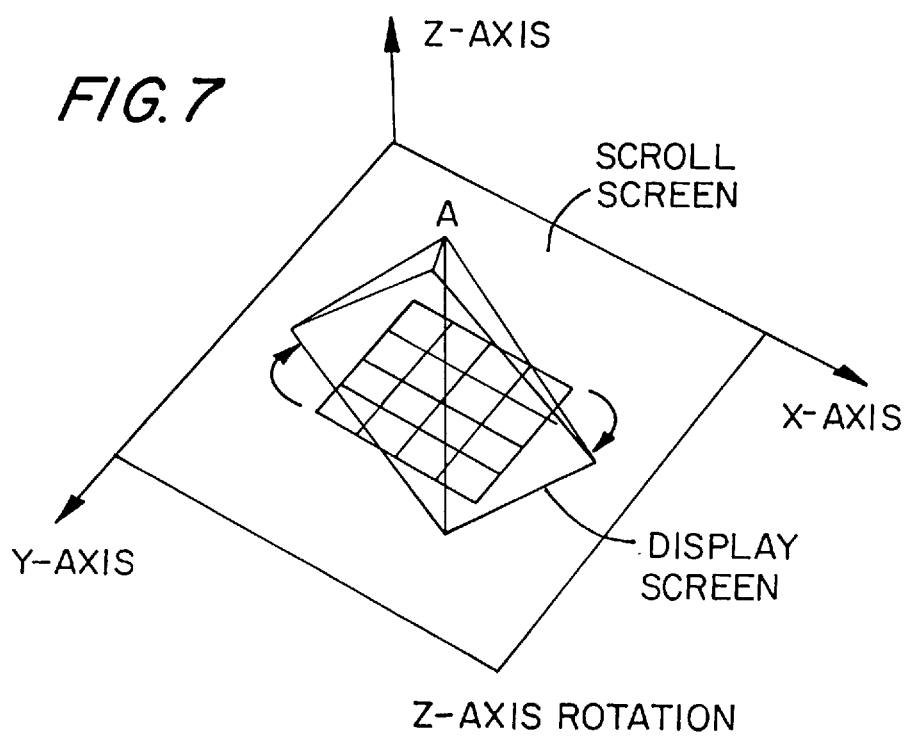
FIG. 7 is a perspective diagram showing the display screen in FIG. 4 that is rotated on the Z-axis.

Referring to the drawings, there is shown a relation among the scroll screen, display screen, and player's viewpoint. FIG. 4 shows the initial state. FIG. 5 shows "X-axis rotation" where the display screen is rotated on the X axis with respect to the scroll screen. FIG. 6 shows "Y-axis rotation" where the display screen is rotated on the Y axis with respect to the scroll screen. FIG. 7 shows "Z-axis rotation" where the display screen is rotated on the Z axis with respect to the scroll screen.

(5) Parameters and coefficients used in movement rotation transformation formula When the display screen changes from the state shown in FIG. 4 to any of the states shown in FIGS. 5–7, the image on the display screen changes to those shown in FIGS. 9–11. FIG. 8 corresponds to FIG. 4, FIG. 9 to FIG. 5, FIG. to FIG. 6, and FIG. 11 to FIG. 7. Below FIGS. 8–11 are rotation matrix parameters for the state in each Figure.

Figure 12:
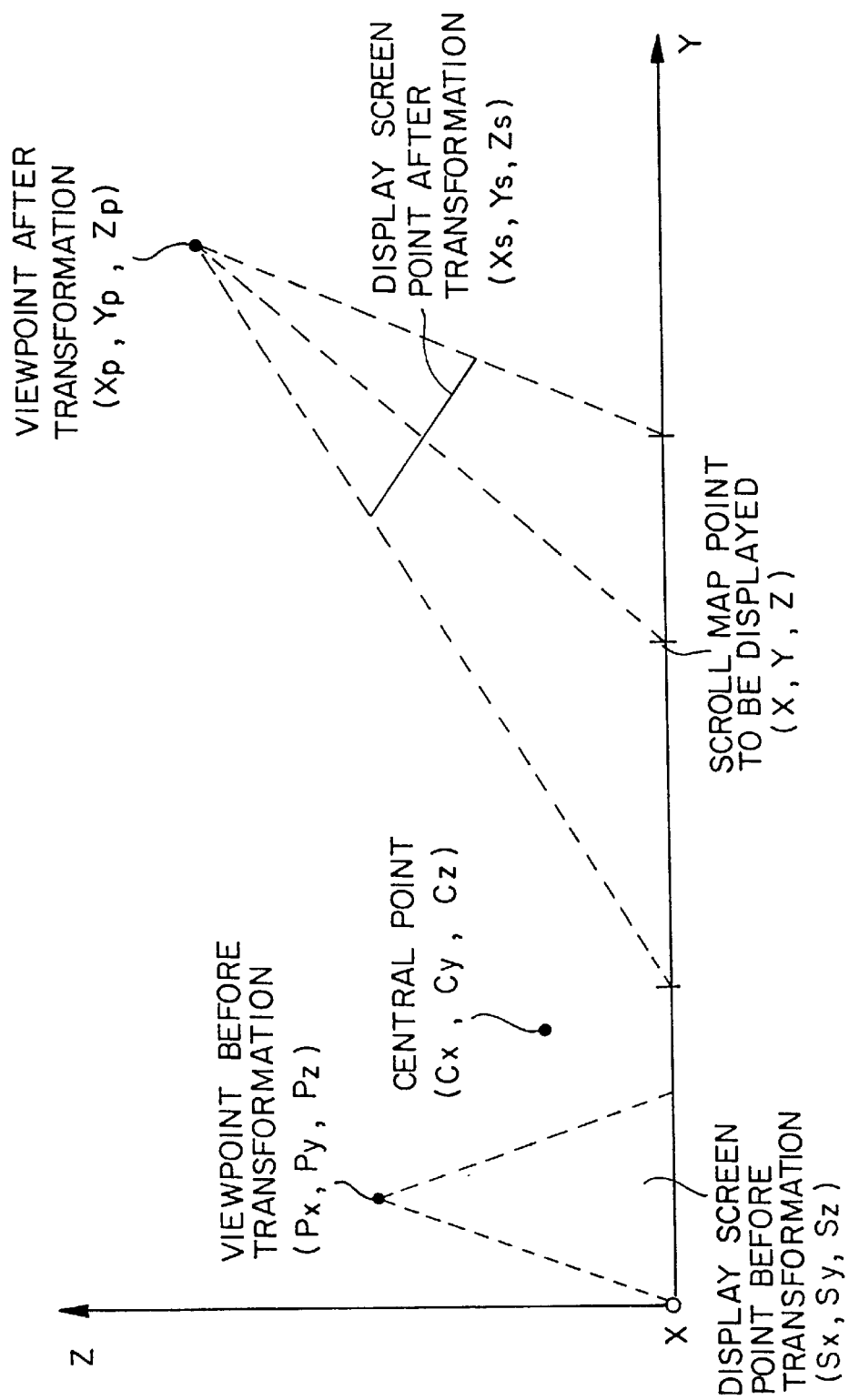
FIG. 12 is a graph explaining the "parameters" and "coefficients" of the movement rotation transformation formula.

Now, referring to FIG. 12, there is shown "parameters" and "coefficients" used in the movement rotation transformation formula used in this embodiment. This figure shows that the display screen after movement and rotation contains a collection of points where the viewpoint through the display screen meets the fixed scroll map after the viewpoint and the display screen have been rotated around the central point.

In the figure, the original viewpoint (before coordinate transformation) (Px, Py, Pz) is rotated around the central point (Cx, Cy, Cz), and the viewpoint after transformation and parallel displacement is represented as (Xp, Yp, Zp). This is given by the following formula:

$$\begin{pmatrix} Xp \\ Yp \\ Zp \end{pmatrix} = \begin{pmatrix} ABC \\ DEF \\ GHI \end{pmatrix} \begin{pmatrix} Px - Cx \\ Py - Cy \\ Pz - Cz \end{pmatrix} + \begin{pmatrix} Cx \\ Cy \\ Cz \end{pmatrix} + \begin{pmatrix} Mx \\ My \\ Mz \end{pmatrix} \quad (1)$$

Where, Mx, My, and Mz are parallel displacement amount for the X, Y, and Z axes, respectively, and A–I are rotation matrix parameters.

A point on the display screen (Sx, Sy, Sz) is rotated in the same manner as before, and is transformed to the point (Xs, Ys, Zs) This movement and rotation formula is given as follows:

$$\begin{pmatrix} Xs \\ Ys \\ Zs \end{pmatrix} = \begin{pmatrix} ABC \\ DEF \\ GHI \end{pmatrix} \begin{pmatrix} Sx - Cx \\ Sy - Cy \\ Sz - Cz \end{pmatrix} + \begin{pmatrix} Cx \\ Cy \\ Cz \end{pmatrix} + \begin{pmatrix} Mx \\ My \\ Mz \end{pmatrix} \quad (2)$$

A viewpoint line going from the viewpoint after transformation to the point on the scroll screen to be displayed through the display screen point is represented by the following formula:

$$\frac{X - Xp}{Xs - Xp} = \frac{Y - Yp}{Ys - Yp} = \frac{Z - Zp}{Zs - Zp} \quad (3)$$

The scroll screen displayed here, that is, the background image stored in the VRAM 24, is a plane with Z=0. Therefore, the X and Y coordinates of the scroll screen are given by the following formulas:

$X = k(Xs-Xp)+Xp$ $Y = k(Ys-Yp)+Yp$ \quad (4)

where, $k = -Zp/(Zs-Zp)$

The coefficient k is represented as follows from formulas 1 and 2:

$$k = \frac{-\{G(Px - Cx) + H(Py - Cy) + I(Py - Cy) + Cz + Mz\}}{G(Sx - Px) + H(Sy - Py) + I(Sy - Py)} \quad (5)$$

In formula (5), the viewpoint before transformation (Px, Py, Pz), central point before transformation (Cx, Cy, Cz), parallel displacement amount (Mx, My, Mz), and rotation matrix parameters A–I are constant in one frame; so, the coefficient k varies according to a point (Sx, Sy, Sz) on the display screen before transformation.

Normally, Sx is equal to the H count value which is the horizontal coordinate value of the monitor screen, Sy is equal to the V count value which is the vertical coordinate value of the monitor screen, and Sz is equal to 0, because the display screen before transformation matches the monitor screen.

When the display screen is rotated with the value of the parameter G set to 0, as in X axis rotation from the initial state shown in FIG. 8 to the screen shown in FIG. 9, the coefficient k becomes constant to the horizontal direction of the monitor screen and therefore, it varies only when the V count value varies.

When the display screen is rotated with the value of the parameter H set to 0, as in Y axis rotation, the coefficient k becomes constant to the vertical direction of the monitor screen and, therefore, it varies only when the H count value varies. In addition, for a 3-axis rotation transformation where both parameters G and H are non-zero values, the coefficient k varies according only to the V count value and H count value. When the display screen after transformation is rotated on the screen axis which is perpendicular to the display screen after transformation, the points Sx and Sy on the display screen before transformation vary according only to the V count value and H count value, and the point Sz on the display screen before transformation remains constant.

(6) Components of the scroll engine 21

Referring to FIG. 13, there is shown the components of the scroll engine 21 described above. In the figure, 41 is the background image generation section, 42 is the sprite window detection section, 43 is the display control section, and 44 is the window control section. The background image generation section 41 will be described later. The following describes the other components sequentially.

(6-1) Sprite window detection section 42

The sprite window detection section 42 is connected to the sprite engine 20 via the terminal 40. The sprite window detection section 42 checks the MSB, contained in the sprite image data read from the frame buffer 23, to see if it has been changed.

(6-2) Display control section 43

The display control section 43, which is connected to the background image generation section 41 and the window control section 44, controls image data so that sprite image data and background image data are combined.

(6-2-1) Switches 50, 51, and 52

The display control section 43 contains the switches 50, 51, and 52. While the switching signal FGSW is on to indicate that the window should be open, the switch 50 replaces the color code of the foreground image data with 00H (H indicates that the number is a hexadecimal number); while the switching signal FGSW is off to indicate that the window should not be open, the switch 50 causes the foreground FG image data to be output unchanged. Similarly, while the switches 51 and 52 (BG0SW and BGLSW) are on, they replace the color code of background image data BG0 and BG1, respectively, with 00H; while the switching signals BG0SW and BG1SW are off, the switches cause the background image data BG0 and BG1, respectively, to be output unchanged.

(6-2-2) Priority circuit 54

The above described switches 50–52 are connected to the priority circuit 54. This priority circuit 54 accepts the foreground FG image data and the background BG and BG1 image data. In addition, the priority circuit 54 checks the color code contained in foreground FG image data and the background BG0 and BG1 image data to see if it is 00H. If it is 00H, the priority circuit assumes that the image data is transparent. If it is not 00H, the priority circuit compares the priority codes of image data with each other and outputs image data with the largest priority code value.

(6-2-3) Color circuit 55

The color circuit 55 is connected to the priority circuit 54. When image data from the priority circuit 54 is in the palette format, the color circuit 55 accesses the color RAM 25 with the use of a color code, obtains RGB data representing the level of three primary colors as the address of the color code, and outputs this RGB data from the terminal 56. When image data is in the RGB format, RGB data is used as display color data. RGB data is converted to analog data by the D/A converter 31 shown in FIG. 1, output from the terminal 32 as the RGB video signal, and displayed on the monitor (not shown in the figure).

(6-3) Window control section 44

The window control section 44 sends sprite image data to the display control section, based on the changed MSB, as the window signal which will cause data to be displayed according to the sprite image shape. The window control section 44 contains the control register 45. The contents of the control register 45 may be re-written by the CPU 15 via the terminal 46. The control register 45 contains the following types of data a–e.

a. In-out control bit

This bit indicates where the window is to be opened, with respect to the window shape specified by the window flag in the foreground: inside the window (window flag=1) or outside the window (window flag=0).

b. Sprite window control word

This word, consisting of 3 enable bits, indicates where the window is to be opened: in the foreground FG or in one of backgrounds BG0 and BG1.

c. Rectangle window position data

This data indicates the X and Y coordinates of the rectangle window start position and those of the end position.

d. Rectangle window control word

This word consists of the in-out bit and enable bits of a rectangle window.

Note that the three types of data described above—the sprite window control word, rectangle window position data, and rectangle window control word—are specified for each of a plurality of sprite windows and a plurality of rectangle windows.

e. AND-OR control word

This word indicates where the window is to be opened: in the logical AND area or in the logical OR area of a plurality of sprite windows and rectangle windows.

According to the contents of the control register 45 described above, the window control section 44 generates the switching signals FGSW, BG0SW, and BG1SW indicating the position where the window is to be opened for each of the foreground FG and the backgrounds BG0 and BG1, and sends the signals to the display control section 43.

(7) Configuration of the background image generation section 41

Figure 14:
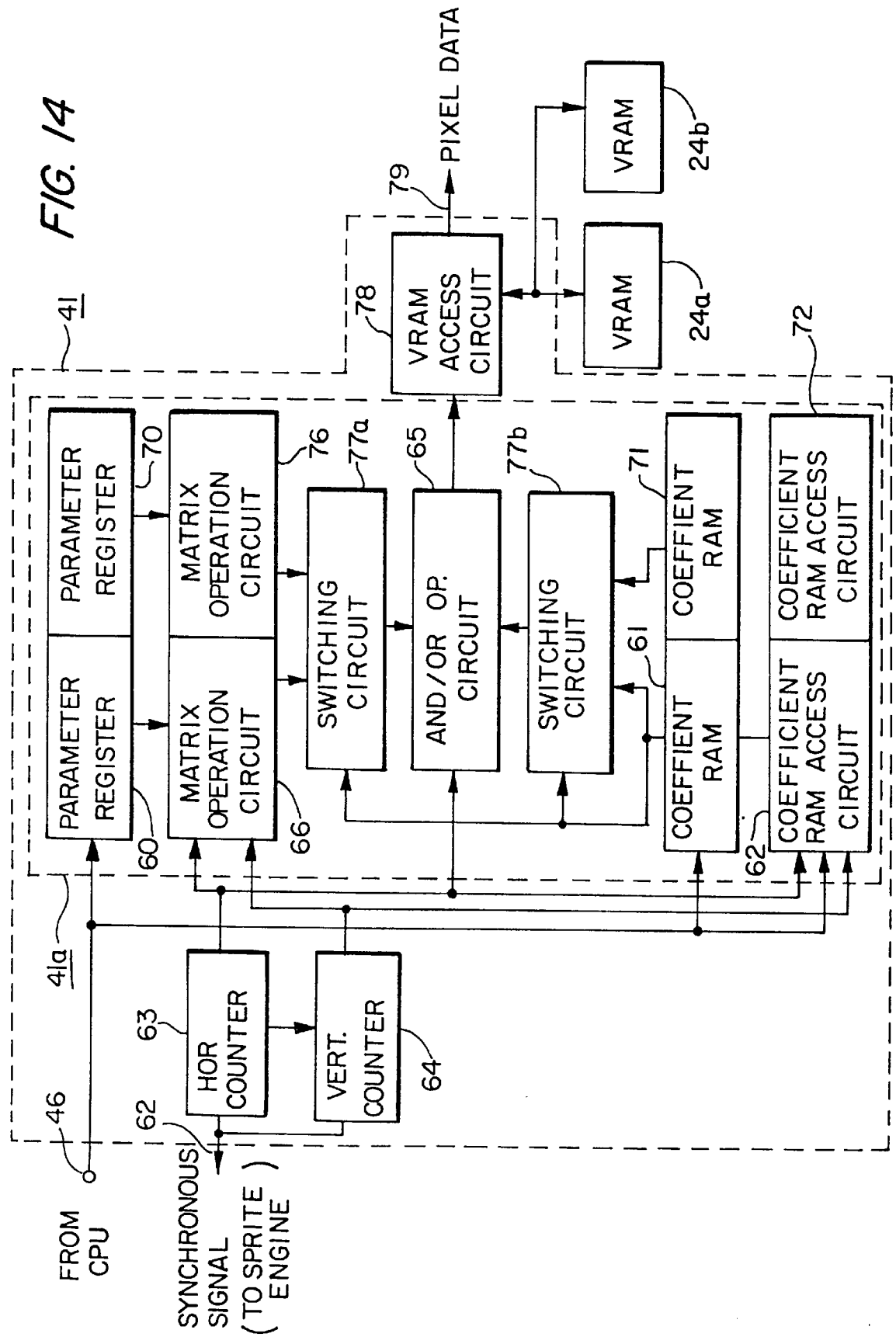
FIG. 14 is a block diagram of the background image generation section 41.

FIG. 14 is a block diagram of the background image generation section 41. The background image generation section 41 generates background images BG0 and BG1. It reads the pattern name data of two frames from the VRAM 24, reads pattern data from the VPAM 24 using the pattern name data of these two frames, and outputs the pixels of the above pattern data to obtain the image data of two frames of background images BG0 and BG1. The image data of each of background images BG0 and BG1 consists of 15 bits (the bits shown in FIG. 2 excluding the window flag).

The background image generation section 41 consists basically of the signal processing means, switching means, address generation means, horizontal counter 63, and vertical counter 64.

(7-1) Signal processing means

The signal processing means, which outputs a transformation processing signal necessary to execute movement transformation processing and/or rotation transformation processing for image information, consists of a pair of components. This means consists of a pair of components because background image BGO has two parameters—rotation parameter A and rotation parameter B.

(7-1-1) Parameter registers 60 and 70

The parameter registers 60 and 70 contain parameters used to perform coordinate transformation processing. The CPU 15 writes mutually-independent rotation matrix parameters A–F, the viewpoint before transformation (Px, Py, Pz), the central point (Cx, Cy, Cz), and the parallel displacement (Mx, My, Mz) into each of parameter the register 60 and the parameter register 70 via the terminal 46.

(7-1-2) Matrix operation circuits 66 and 76

The matrix operation circuits 66 and 76 perform matrix operation using the parameters described above. The matrix operation circuits 66 and 76 each assign rotation matrix parameters A–F, the viewpoint before transformation (Px, Py, Pz), the central point (Cx, Cy, Cz), and the parallel displacement (Mx, My) to the formula (1) to calculate a viewpoint after transformation Xp and Yp. And, at the same time, they assign matrix parameters A–F, the central point (Cx, Cy, Cz), the parallel displacement (Mx, My), the H count value for Sx, the V count value for Sy, and the constant 0 for Sz into the formula (2) to calculate the points (Xs and Ys) on the display screen after transformation.

(7-1-3) Coefficient RAMs 61 and 71 and coefficient RAM access circuits 62 and 72

The CPU 15 writes mutually-independent one-screen coefficients k into each of the coefficient RAMs 61 and 71 via the terminal 46. This coefficient k calculated by the CPU is, for example, 16 bits per pixel, and is written during a vertical or horizontal blanking period. Notice that the amount of data required for the one-screen coefficient k that is written by the CPU 15 into the coefficient RAM 61 or 71 depends on the type of movement rotation transformation. The minimum amount of data for the coefficient k, calculated by the CPU 15, is written into the coefficient RAMs 61 and 71 via the terminal 46. And, for the coefficient access circuits 62 and 72, the CPU 15 specifies the access start address and two address increments based on the H count value and V count value, and controls access to the coefficient RAMs 61 and 71 according to the type of movement rotation transformation.

The coefficient RAM access circuits 62 and 72 are hardware units that access the coefficient RAMs 61 and 71 to call the coefficient k. That is, the coefficient RAMs 61 and 71 sequentially read the coefficient k of each pixel as the coefficient RAM circuits access it, and send the coefficient k to the switching circuit 77b which will be described later.

Figure 15:
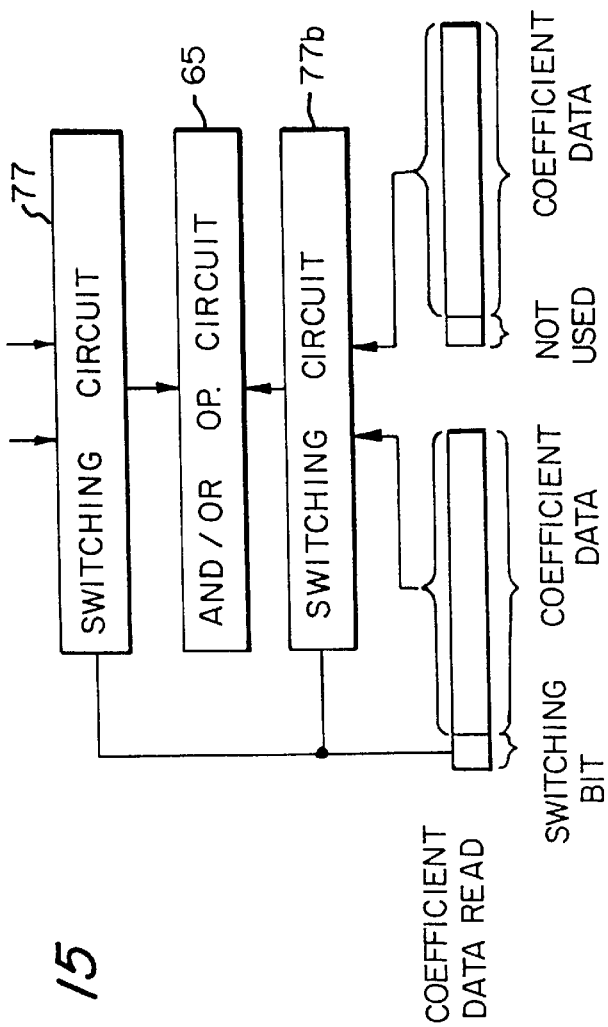
FIG. 15 is a conceptual block diagram showing a part of the background image generation section 41.

The most significant bit of a 16-bit coefficient for a pixel, which is stored in the coefficient RAM 61, is used as the display switching bit, the most significant bit of a 16-bit coefficient stored in the coefficient RAM 71 is not used. FIG. 15 conceptually shows this mechanism.

(7-2) Switching means

The switching means, consisting of the switching circuits 77a and 77b, selectively switch the conversion processing signal according to the coefficient k set up for each pixel. The matrix operation circuits 66 and 76 are connected to the switching circuit 77a, and coefficient RAMs 61 and 71 are connected to the switching circuit 77b.

Xp, Yp, Xs, and Ys are sent from the matrix operation circuits 66 and 76 to the switching circuit 77a. The most significant bit of the coefficient k read from the coefficient RAM 61 is sent to the switching circuits 77a and 77b. The switching circuit 77a selects the output of the matrix operation circuit 66 when the MSB of the display switching bit is 1, and selects the output of the matrix operation circuit 76 when it is 0. The switching circuit 77b selects the output of the coefficient RAM 61 when the MSB is 1, and selects the output of the coefficient RAM 71 when it is 0.

(7-3) Address generation means

The address generation means, connected to the switching means, generates a read address for image information for which movement transformation processing and/or rotation transformation processing have been done based on the transformation processing signal. It consists of the AND/OR circuit 65, connected to the switching circuits 77a and 77b, and the VRAM memory access circuit 78 connected to the AND/OR operation circuit 65.

The AND/OR circuit 65 performs the operation of formula (4) in synchronization with the horizontal count value, using Xp, Yp, Xs, and Ys sent from the matrix operation circuit 66 or 76 to calculate the coordinates X and Y on the scroll screen. The coordinates X and Y obtained from the AND/OR operation circuit are sent to the VRM access circuit 78.

The VRAM access circuit 78 accesses the VRAMs 24a and 24b using the coordinates X and Y on the scroll screen as the pixel addresses in the background. The low-order 3 bits of each of the coordinates X and Y (when the cell is 8 dots×8 dots in size) are used as a pixel position address in the cell, and the bits except those 6 bits are used as a pattern name address. The VRAM access circuit 78 reads the pattern name data from the VRAMs 24a and 24b, reads pattern data (color code) from the VRAMs 24a and 24b using the pattern data address and pixel position address in this pattern name data, generates pixel data, except windows in the format shown in FIG. 2, using the color code and the priority code in the pattern name data, and outputs it from the terminal 79.

(7-4) Horizontal counter 63 and vertical counter 64

The horizontal counter 63 counts dot pulses generated by the built-in oscillator to generate the H count value and horizontal synchronization pulses. The vertical counter 64 counts the horizontal synchronization pulses to generate the V count value and vertical synchronization pulses. The H count value and V count value described above are sent to the matrix operation circuits 66 and 67 and to the coefficient RAM access circuits 62 and 72, and the H count value is sent to the AND/OR operation circuit 65. The horizontal and vertical synchronization pulses are sent to the sprite engine 20 via the terminal 62. In the background image generation section 41, the components, except the horizontal counter 63, vertical counter 64, and VRAM access circuit 78, are integrated into one circuit block 41a.

II. Effects of the Embodiment

The effects of this embodiment having the above configuration are as follows:

(1) Split display switching of background images

The switching bit contained in the coefficient k, which is used as the display switching signal, is set to a specified value in advance on a pixel basis. The output from the switching circuits 77a and 77b is switched according to this display switching signal, and address generation data for different movement/rotation transformation processing is output selectively to the AND/OR operation circuit 65. This allows a plurality of image data pieces, each of which has been transformed independently, to be generated. Therefore, the display (monitor) screen can be split into any number of screens according to the display switching signal and, for each of these split screens, an independent image data may be supplied. This makes it possible for the display (monitor) screen to display an independent image in each split screen.

The following explains how this operation is performed on background image BG0. The mode in which the rotation parameters A and B are used for background image BG0 is one of the following four:

Mode 0: Uses rotation parameter A.

Mode 1: Uses rotation parameter B.

Mode 2: Switches the image based on the coefficient table into which the coefficients have been read from the coefficient table of rotation parameter A.

Mode 3: Switches the image based on the rotation parameter window.

In modes 0 and 1, image data according to a pair of rotation parameter tables is generated. In modes 2 and 3, background image data created by combining image data generated according to rotation parameter A and image data generated according to parameter B is generated.

Figure 16:
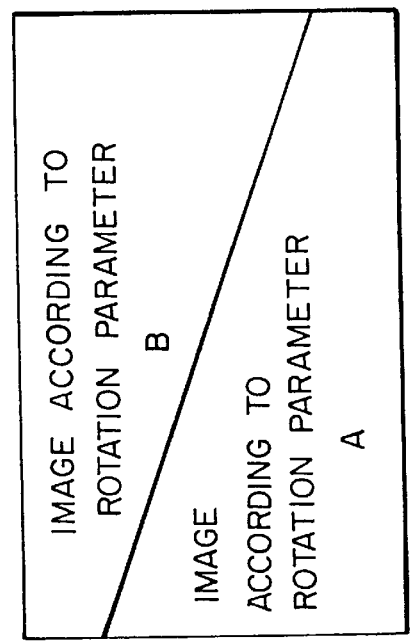
FIG. 16 is a model diagram showing the display screen that is split by rotation parameters A and B.

In mode 2, image data according to rotation parameter A is generated when the most significant bit of the coefficient data read from the coefficient RAM 61 is 1; image data according to rotation parameter B is generated when the most significant bit of the coefficient data is 0. (Refer to FIG. 16)

Figure 17:
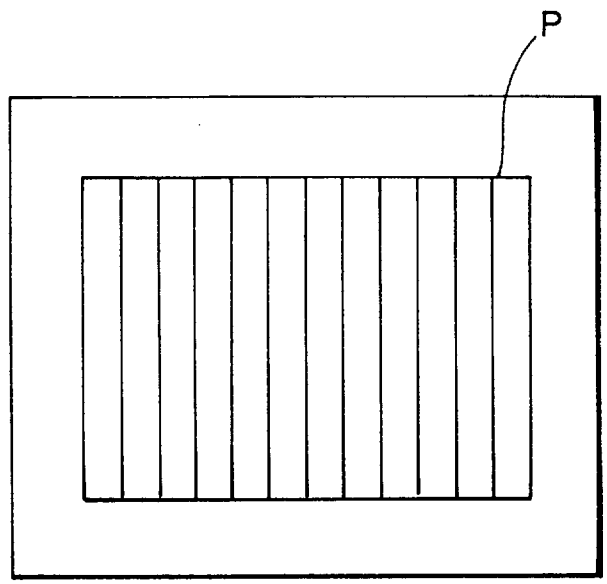
FIG. 17 is a diagram explaining the movement rotation of an image.
Figure 18:
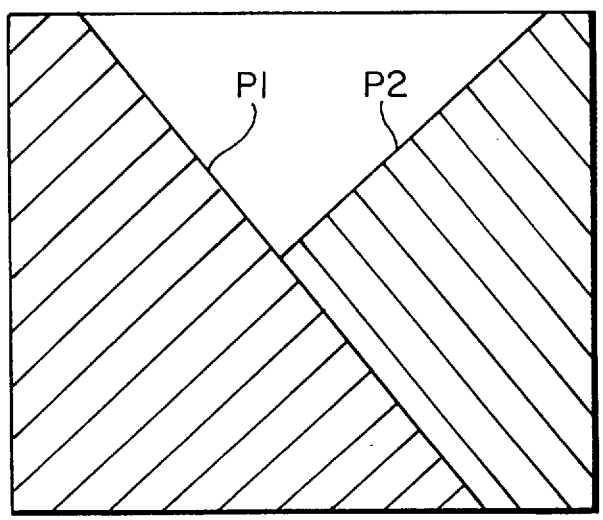
FIG. 18 is a diagram explaining the movement rotation of an image.

The following explains, more in detail, how image processing in mode 2 differs from the prior art by referring to FIGS. 17 and 18. Suppose that the parameters and coefficients written in the parameter register 60 and the coefficient RAM 61 are used for right rotation, that the parameters and coefficients written in the parameter register 70 and the coefficient RAM 71 are used for left rotation, and that the background image before movement rotation transformation is the rectangle P where vertical stripes are displayed (FIG. 17). In this case, the prior image processing method is as follows: that is, the same image data in the rectangle P is stored in two VRAMs, one for P1 and the other for P2, two scroll screen coordinates are calculated for P1 and P2 whenever they are moved or rotated, image data for P1 and that for P2 are read from VRAM for each screen according to the scroll screen coordinates that have been calculated and, after comparing priorities, the composite screen P1+P2 is displayed (FIG. 18).

The prior art requires two AND/OR operation circuits because scroll screen coordinate calculation must always be done twice (that is, the portion of P2 which comes under P1 must also be calculated), and requires at least two VRAMs where image data is stored.

On the other hand, in this embodiment, the scroll screen coordinates for movement and rotation images 21 and P2 are calculated by switching the switching circuits 77a and 77b according to the value of the coefficient k. This means that the coordinates X and Y of the part of the image P2 which comes under the image P1 need not be calculated (omitted). Therefore, only one AND/OR operation circuit is required, and only one of image data, P1 or P2, need be read. Thus, only one VRAM 24 is required. In addition, if image information on the original image (background image) of P1 matches that of P2, only one image information on the original image need be stored in the VRAM. Thus, this embodiment reduces the operation time, the number of VRAMs, and the size of the VRAM area. In FIG. 18, note that the display switching bit of the coefficient k corresponding to the display area of right rotation image P1 is 1.

As describe above, switching the switching circuits 77a and 77b according to the value of the display switching bit of the coefficient k causes the background image to be split into a plurality of areas, and allows movement and rotation processing to be performed in each of these areas. This screen split function utilizes the VRAM that is limited in size (reduced space for storing original image), thereby allowing various background images to be generated.

In mode 3, the in-out bit of the window control section 44 is used to switch from one image data to another (Refer to the description of the MSB-on function). That is, if the window is used as a transparent processing window, image data obtained according to rotation parameter B is generated in an area to be treated as a transparent window; image data obtained according to rotation parameter A is generated in other areas. (Refer to FIG. 19).

Therefore, in mode 3, it is possible to generate a window of the sprite character shape thorough the use of the window control section 44 in the scroll engine 21 and to generate image data that is switched between the inside and the outside of this window. In this case, the ability to use the sprite character window of any shape gives the player more dramatic effects than simply-shaped windows such as a rectangle window or line window. Split display is also possible on a symmetrically-split screen with the use of a rectangle window or a line window.

(2) Effects of movement and rotation transformation processing

When the background image is moved in this embodiment (that is, when rotation transformation processing is performed for the display screen), the rotation transformation central point (Cx, Cy, Cz), viewpoint before coordinate transformation (Px, Py, Pz), parallel displacement amount Mz, and rotation matrix parameters G, H, and I usually remain constant for one frame. If the display screen before transformation is parallel with the XY plane (Sz is constant), k is the function of Sy (display screen vertical coordinate value) during X axis rotation, and is constant with respect to the horizontal direction of the display screen. k is the function of Sx (display screen horizontal coordinate value) during Y axis rotation, and is constant with respect to the vertical direction of the display screen. During Z axis rotation, k is always constant.

In this embodiment, the CPU 15 calculates the value of k and stores the coefficient k for one screen in the coefficient RAMs 61 and 71. And, the matrix operation circuits 66 and 76 and the AND/OR operation circuit 65 read parameters from the parameter registers 60 and 70, and the coefficient k from the coefficient RAMs 61 and 71, in the timing specified by the CPU 15 to perform operation. So, as compared with the prior art in which a large AND/OR operation circuit is used, this embodiment significantly reduces the amount of coordinate transformation calculation and therefore the overhead of the CPU 15, allowing the CPU to do some other jobs. Thus, the availability of the CPU 15 can be enhanced, and programs can be designed more freely.

Because the MSB of the coefficient is used as the display switching signal in this embodiment when rotation transformation processing is performed for the display screen, the coefficient k itself is not changed during operation; instead, the method for reading this coefficient need only be changed. Because of this, the CPU 15 has only to set the parameters and coefficients necessary for the operation.

Figure 20A:
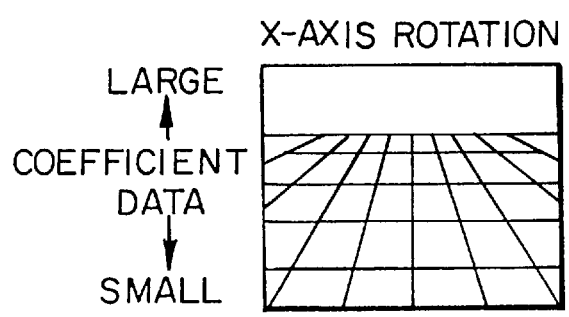
Figure 20B:
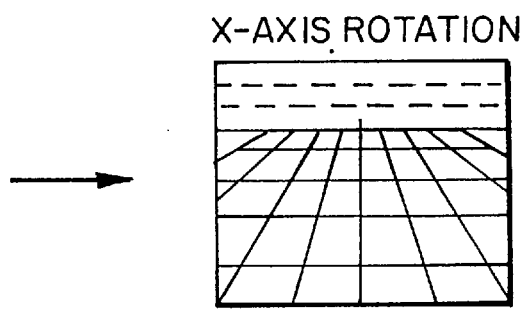

More specifically, when the display screen is rotated on the X axis as shown in FIG. 20a, the coefficient value (coefficient data value) of a line toward the top of the screen becomes larger. When the land is displayed in the scroll screen, a scroll screen different from the land scroll screen, such as a sky scroll screen, is displayed beginning at a line whose coefficient value exceeds a specified value to make the player think that there is a horizon between the two (20B). When this screen display is rotated on the screen axis (FIGS. 21a and 21b), there is no need to change the coefficient data only the method for reading the coefficient data need only be changed. Thus, because the display area can be switched according to the MSB of the coefficient data, no special operation is needed for the display area even when the scroll screen is rotated.

In addition, when "X axis rotation+Z axis rotation" or "Y axis rotation+Z axis rotation" is performed on the display screen, k becomes constant with respect either to the vertical direction or to the horizontal direction. This reduces the operation load on the CPU 15, increases the speed of rotation processing on the display screen, and allows the system to respond to the game player in real time.

Figure 22A:
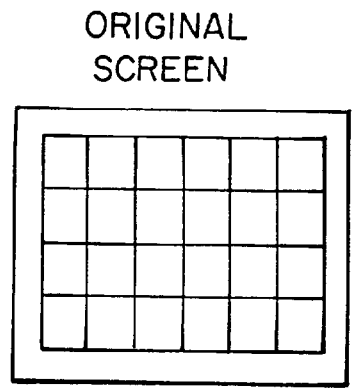
FIGS. 22A, 22B, and 22C are diagrams explaining an "X-axis rotation+screen axis rotation" image that looks as if 3-axis rotation was performed.
Figure 22B:
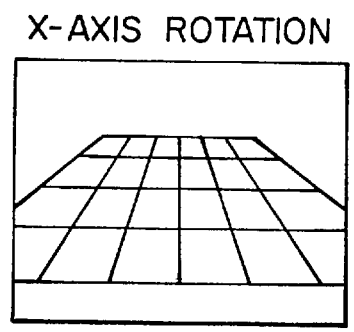
Figure 22C:
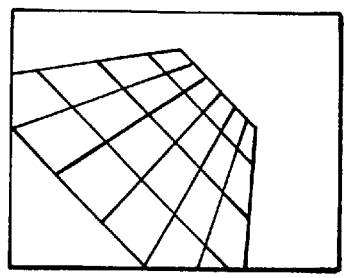
Figure 23:
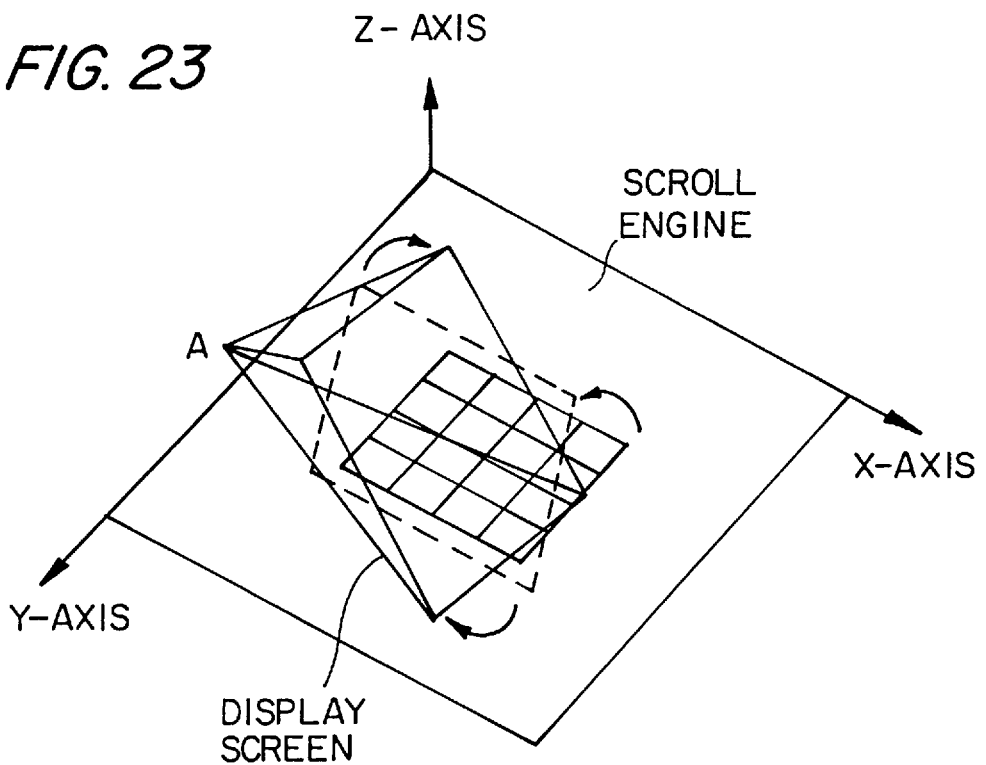
FIG. 23 is a diagram showing the relation among the scroll screen, display screen, and player's viewpoint after "X-axis rotation+screen axis rotation"

When 3-axis (X, Y, and Z axes) rotation operation is performed, the value of k varies according to a dot on the display screen. Therefore, it is impossible to do this type of transformation processing on the CPU 15 which uses a 32-bit RISC type MPU. However, as shown in FIGS. 22a, 22b and 22c, this embodiment enables X axis rotation and then screen axis rotation successively, making it possible to generate image data which makes the player feel as if 3-axis rotation was performed. FIG. 23 shows the relation among the scroll screen, display screen, and viewpoint when "X axis rotation+screen axis rotation" has been done.

When the display screen is rotated only on the screen axis, k becomes constant with respect either to the horizontal direction or to the vertical direction of the display screen. Therefore, when the CPU 15 allows the game player to rotate the character on the screen axis, this embodiment can respond to the player's operation in real time.

In addition, scaling in the horizontal or vertical direction is possible by accumulating the value of k in X or Y in the formula (4). For example, for X-axis rotation, the CPU 15 calculates as many coefficients k as the number of lines in the vertical direction, because the coefficient k becomes constant with respect to the horizontal direction. At this time, because the CPU 15 need only to access the coefficient RAM 61 only when the H count value changes, the CPU 15 specifies 0H (H indicates a hexadecimal number) for the address increment which is synchronous with the V count value, and 2H (the coefficient is 16 bits in size) for the address increment which is synchronous with the V count value. Thus, the CPU 15 does not have to access the coefficient RAM 61 on a pixel basis; the number of accesses can vary according to the type of movement and rotation transformation. So, the CPU 15 need only to store the minimum number of coefficients k in the coefficient RAM 61.

Figure 24A:
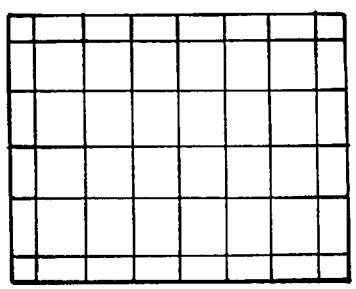
FIGS. 24A and 24B are diagrams explaining an image for which image processing has been performed with the sphere formula as the parameter.
Figure 24B:
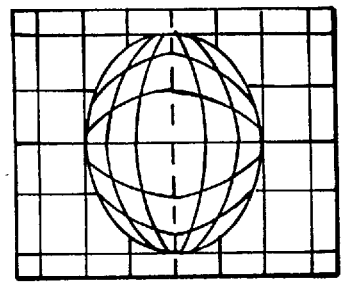

In addition, because this embodiment is compatible with every condition in which the coefficient k varies according to the H count value or V count value, the screen need not always be a plane but may be a curved surface, allowing for various types of image processing. For example, as shown in FIGS. 24a and 24b, image processing using the sphere formula as parameters or image processing for a curved image may be possible.

(3) Coefficient table control

In this embodiment, the rotation parameters, other than rotation parameters A and B, are used to calculate display coordinates. They are stored in the coefficient table in the coefficient RAM. Various types of image representation is possible by reading this coefficient table on a line or on a dot basis. There are the following four types of coefficient data mode depending upon the use of the parameters read from the coefficient table:

Mode 0: Uses as scaling coefficients kx and ky.

Mode 1: Uses as scaling coefficient kx.

Mode 2: Uses as scaling coefficient ky.

Mode 3: Uses as viewpoint coordinate Xp after rotation transformation.

When mode 0 is specified, kx and ky read from the rotation parameter table are ineffective; data read from the coefficient table is used as kx and ky. When mode 1 is specified, only ky read from the rotation parameter table is used; data read from the coefficient table is used as kx. Conversely, when mode 2 is specified, only kx read from the rotation parameter table is used; data read from the coefficient table is used as ky. When mode 3 is specified, the viewpoint coordinate Xp in the X direction for which rotation transformation has been performed according to the data read from the rotation parameter table is ineffective; data read from the coefficient table is used as Xp.

(4) Summary of image processing with the use of the most significant bit of coefficient data The most significant bit of the coefficient k is usually used as the transparency bit. A dot using coefficient data whose most significant bit is 1 is forced to change to a transparent dot. Note that, when rotation parameter mode 2 is selected for background image BG0, the most significant bit of data read from the coefficient table for the rotation parameter A is used to switch the rotation parameter. That is, when the most significant bit is 1, image data specified by the rotation parameter A is generated. When the most significant bit is 0, image data specified by the rotation parameter B is generated.

III. Other Embodiments

This invention is not limited to the above embodiment, but any shapes or number of the components may be selected. In addition, it includes the following embodiments:

1 In the above embodiment, the display switching bit of the coefficient k from the coefficient RAMs 61 and 71 is used to switch the switching circuits 77a and 77b. In addition to this, such signals as the switching signal BG0SW from the window control section 44 may be used to switch the switching circuits 77a and 77b.

2 If one of two types of movement and rotation transformation is limited to a transformation whose parameter G is 0 as in X-axis rotation or Z-axis rotation, the coefficient k need only be read from the coefficient RAM once for each vertical line. Therefore, the coefficient RAMs 61 and 71 may be combined into one by using a register which stores coefficient data read from each line.

Figure 19:
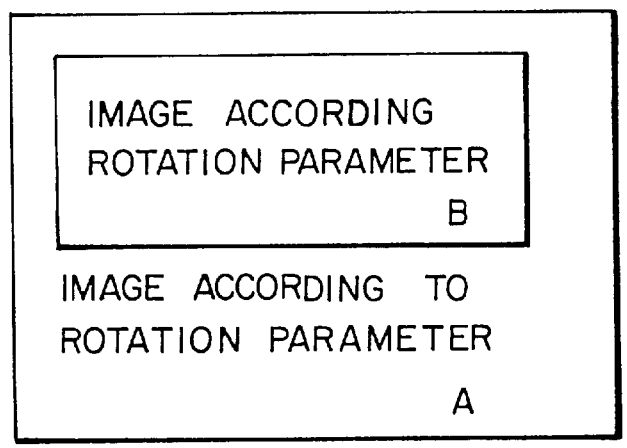
FIG. 19 is a model diagram of the display screen that is split into windows.

3 FIG. 25 shows an example of a circuit used to generate a new image (for example, P1) by moving and rotating the background image (for example P) when there is no need to combine a plurality of images each of which has been transformed independently as shown in FIG. 19. If background images BG0 and BG1 are independently rotated in the circuit shown in FIG. 25, two systems, each containing the parameter register 60, coefficient RAM 61, and AND/OR operation circuit 65, may be provided.

A circuit block (not shown in the figure), which has a configuration similar to that of the block shown in the circuit block 41a in FIG. 14, is connected to the horizontal counter 63 and vertical counter 64, as shown in FIG. 14. The output section of the AND/OR operation circuit in the circuit block (not shown in the figure) is connected to the VRAM access circuit provided separately from the VRAM access circuit 78, and two RAMs are connected to this VRAM access circuit so that the VRAM access circuit can access these two VRAMs. That is, there are a total of four VRAMs in this case.

4 The circuit configuration shown in FIG. 14 is a circuit for one of background images BG0 and BG1. Therefore, a similar circuit configuration is necessary to generate the other background image.

This type of circuit example is shown in FIG. 26. In this example, two VRAM access circuits 78a and 78b are connected to the output of the AND/OR operation circuit 65, and the VRAM 24a and VRAM 24b are connected to the VRAM access circuits 78a and 78b, respectively. The output from the AND/OR operation circuit 65 is switched in the time-sharing mode; background BG0 data is sent to the VRAM access circuit 78a, and background BG1 data to the VRAM access circuit 78b. The VRAM access circuit 78b accesses the VRAM 78b and, as with background image BG0 generates pixel data and outputs it from the terminal 80.

5 A video entertainment system according to this invention may be integrated with a di splay device as with an arcade video entertainment system.

6 It is possible to implement the components of the image processing system according to this invention, except VRAMs, as an IC chip. This embodiment enables the image processing system to be applied to various types of system.

7 A scope of components to be implemented as an IC chip may be selected as necessary. For example, the display image generation block, window control block, and display control block may be packaged on a semiconductor board for use as a video processor IC.

8 Other embodiments include the above described video processor IC further comprising the window detection block.

9 The image processing system according to this invention is most suitable for a video entertainment system.

However, it may be applied to a variety of deices such as a personal computer.

What is claimed is:

1. An image processing system for use in an electronic system including an image memory for storing image information and a CPU, said image processing system comprising:

a plurality of signal processing means functionally connected with said CPU to be supplied with various parameters for coordinate transformation processing, each of said plurality of signal processing means having means for executing coordinate transformation processing based on the parameters in connection with a background image to be displayed on a monitor screen;

switching means, connected to said plurality of signal processing means, for selecting one of said plurality of signal processing means to output a signal including a transformed coordinate data for each pixel of the background image to be displayed, said switching means selecting one of said plurality of signal processing means according to a switching signal preset for each pixel by said CPU; and an address generation means, connected to the output of said switching means, for generating an address for each pixel of image information based on said signal, including the transformed coordinate data and, connected to said image memory, for accessing image information in said image memory with the generated address data; wherein said address data is generated only for each pixel of image information to be displayed;

thereby providing, in a sequence of said selection by said switching means, a set of address data for generating a combined background image.

2. An image processing system as claimed in claim 1, wherein said signal processing means each comprising:

a parameter register for storing parameters used for performing movement transformation processing and/or rotation transformation processing;

a matrix operation circuit for performing movement transformation processing and/or rotation transformation processing using said parameters;

a coefficient RAM for storing data as coefficients; and a coefficient RAM access circuit for accessing said coefficient RAM and for calling said coefficients.

3. An image processing system as claimed in claim 2, wherein said display switching signal is sent from one of said coefficient RAMs to said switching means.

4. An image processing system as claimed in claim 2, wherein said address generation means comprising:

an AND/OR operation circuit connected to said switching means; and an image memory access circuit connected to said AND/OR operation circuit.

5. An image processing method to be performed on an image processing system as defined in claim 1, comprising the steps of:

supplying coordinate parameters before coordinate transformation to each of said plurality of signal processing means;

executing coordinate transformation processing based on said coordinate parameters in each of said plurality of said signal processing means;

selectively switching outputs of said plurality of said signal processing means according to a switching signal supplied from said CPU for each pixel to supply the address generation means with a signal, including the transformed coordinate data from the selected one of said outputs of said plurality of said signal processing means;

generating an address for each pixel of a background image based on the signal, including the transformed coordinate data thereby providing, in sequence of said selective switching, a set of address data; and generating a combined background image data by accessing the image memory with the address data for displaying a plurality of images separately generated on split areas of a monitor screen, wherein only the background image data to be displayed is generated.

6. An electronic system comprising:

(1) a CPU;

(2) a video RAM;

(3) a video processor connected to said video RAM and said CPU, comprising the following (a) to (c):

(a) a plurality of signal processing means functionally connected with said CPU to be supplied with various parameters for coordinate transformation processing, each of said plurality of signal processing means having means for executing coordinate transformation processing based on the parameters in connection with a background image to be displayed on a monitor screen;

(b) switching means, connected to said plurality of signal processing means, for selecting one of said plurality of signal processing means to output a signal, including a transformed coordinate data for each pixel of the background image to be displayed, said switching means selecting one of said plurality of signal processing means according to a switching signal preset for each pixel by said CPU; and (c) an address generation means, connected to the output of said switching means, for generating an address for each pixel of image information based on said signal, including the transformed coordinate data and connected to said image memory, for accessing image information in said image memory with the generated address data; wherein said address data is generated only for each pixel of image information to be displayed;

thereby providing, in a sequence of said selection by said switching means, a set of address data for generating a combined background image.

7. An electronic system comprising:

(1) a CPU;

(2) a first video processor;

(3) a first video RAM, connected to said first video processor, for storing image information;

(4) a second video processor, including a background image generation section and a display control section connected to said background image generation section; and (5) a second video RAM, connected to said second video processor, for storing image information, wherein said background image generation section includes the following (a) to (c):

(a) a plurality of signal processing means functionally connected with said CPU to be supplied with various parameters for coordinate transformation processing, each of said plurality of signal processing means having means for executing coordinate transformation processing based on the parameters in connection with a background image to be displayed on a monitor screen;

(b) switching means, connected to said plurality of signal processing means, for selecting one of said plurality of signal processing means to output a signal, including a transformed coordinate data for each pixel of the background image to be displayed, said switching means selecting one of said plurality of signal processing means according to a switching signal preset for each pixel by said CPU; and (c) an address generation means, connected to the output of said switching means, for generating an address for each pixel of image information based on said signal, including the transformed coordinate data and, connected to said second image memory, for accessing image information in said second image memory with the generated address data; wherein said address data is generated only for each pixel of image information to be displayed thereby providing, in a sequence of said selection by said switching means, a set of address data for generating a combined background image.

8. An electronic system comprising:

(1) a CPU;

(2) a bus line connected to said CPU;

(3) a bus controller for controlling the flow of signals on said bus line;

(4) a first image information processing section, including the following 1) to 3);

1) a first video processor, connected to said bus line, for controlling the generation of sprite image data;

2) a first video RAM, connected to said first video processor, for storing image information for generating video sprite image data; and 3) a frame buffer for expanding said sprite image data;

(5) a second image information processing section, including the following 1) and 2):

1) a second video processor connected to said bus line including:

a background image processing section for generating background image data; and a display control section, connected to said background image generation section and to said first image processing section, for controlling said image data in order to combine said sprite image data and said background image data; and 2) a second video RAM, connected to said second video processor, for storing image information for processing background image data, wherein said background image generation section includes the following (a) to (c):

(a) a pair of signal processing means, functionally connected to said CPU via said bus line to be supplied with various parameters, for coordinate transformation processing, each of said plurality of signal processing means for performing coordinate transformation processing based on the parameters in connection with a background image to be displayed on a monitor screen;

(b) switching means, connected to said pair of signal processing means, for selecting one of said plurality of signal processing means to output a signal, including a transformed coordinate data for each pixel of the background image to be displayed, said switching means selecting one of said pair of signal processing means according to a switching signal preset for each pixel by said CPU; and (c) an address generation means, connected to the output of said switching means, for generating an address for each pixel of image information based on said signal, including the transformed coordinate data and, connected to said second video RAM, for accessing image information in said second video RAM with the generated address data; wherein said address data is generated only for each pixel of image information to be displayed thereby providing, in a sequence of said selection by said switching means, a set of address data for generating a combined background image, including images processed separately by said pair of signal processing means.

9. An electronic system as claimed in claim 6, further comprising a display device for displaying an image according to image data generated from image information.

* * * * *